United States Patent [19]
Kakiyama et al.

[11] Patent Number: 5,600,767
[45] Date of Patent: Feb. 4, 1997

[54] IMAGE CREATION DEVICE

[75] Inventors: Yasushi Kakiyama, Hachioji; Tadahiro Takeguchi; Futoshi Sato, both of Fussa, all of Japan

[73] Assignee: Casio Computer Co., Ltd., Tokyo, Japan

[21] Appl. No.: 390,387

[22] Filed: Feb. 17, 1995

[30] Foreign Application Priority Data

Feb. 25, 1994 [JP] Japan .................................. 6-051077
Feb. 28, 1994 [JP] Japan .................................. 6-052545

[51] Int. Cl.⁶ .................................................. G06T 11/00
[52] U.S. Cl. .................................... 395/135; 395/133
[58] Field of Search ........................... 395/133, 135, 395/125, 141, 152–154, 155, 161

[56] References Cited

U.S. PATENT DOCUMENTS 5,057,019  10/1991  Harvey .......................... 434/155
5,289,568   2/1994  Hosoya et al. ................... 395/135

FOREIGN PATENT DOCUMENTS

0275124A2   7/1988  European Pat. Off. .
0571934A2  12/1993  European Pat. Off. .
0584759A2   3/1994  European Pat. Off. .
WO94/08311   4/1994  WIPO .

Primary Examiner—Almis R. Jankus
Attorney, Agent, or Firm—Frishauf, Holtz, Goodman, Langer & Chick

[57] ABSTRACT

An image creation device which combines a plurality of part images into a target image. An attribute setting unit sets data on a sex, age, etc., of the target image. A selection unit selects the respective part images which constitute the target image. When a controller synthesizes the selected part images, it disposes the respective part images at positions depending on the set attributes in an image storage. When the controller synthesizes the selected part images, it disposes the respective selected part images at positions depending on the set positional relationship in the image storage.

15 Claims, 28 Drawing Sheets

FIG.3

PART IMAGE ROM

| NO. | IMAGE NO. | 01 | 02 | | 20 |
|---|---|---|---|---|---|
| 1 | CONTOUR | | | | |
| 2 | HAIR STYLE | | | | |
| 3 | EYES | | | | |
| 4 | NOSE | | | | |
| 5 | MOUTH | | | | |
| 6 | EYEBROWS | | | | |
| 7 | UNDER-EYE WRINKLES | | | | |
| 8 | CHEEK WRINKLES | | | | |
| n | FOREHEAD WRINKLES | | | | |

FIG.4

DATA RAM

| | NAME DATA STORAGE | ADDRESS DATA STORAGE | TELEPHONE NO. DATA STORAGE | PORTRAIT DATA STORAGE | | | | | | ATTRIBUTE DATA STORAGE |
|---|---|---|---|---|---|---|---|---|---|---|
| | | | | PN1 | PN2 | PN3 | PN4 | PN5 | PN6 | |
| DM1 | | | | | | | | | | |
| DM2 | | | | | | | | | | |
| ---- | | | | | | | | | | |
| DM49 | | | | | | | | | | |
| DM50 | | | | | | | | | | |
| | I | P | | Q | | | | | | |

42

REFERENCE POINT ON A SYNTHESIS PLANE (0,0)
REFERENCE POINT FOR SYNTHESIS POSITION OF PART IMAGE
PART IMAGE
43

| NO. | PART | REFERENCE SYNTHESIS POSITION |
|---|---|---|
| 1 | CONTOUR | $x_1, y_1$ |
| 2 | HAIR STYLE | $x_2, y_2$ |
| 3 | EYES | $x_3, y_3$ |
| 4 | NOSE | $x_4, y_4$ |
| 5 | MOUTH | $x_5, y_5$ |
| 6 | EYEBROWS | $x_6, y_6$ |
| 7 | UNDER-EYE WRINKLES | $x_7, y_7$ |
| 8 | CHEEK WRINKLES | $x_8, y_8$ |
| n | FOREHEAD WRINKLES | $x_n, y_n$ |

| ITEMS / ADDRESS NO. | ATTRIBUTE | | CHANGE OF PART POSITION | | | | | | ADDITION OF PART | | |
|---|---|---|---|---|---|---|---|---|---|---|---|
| | SEX | AGE | CONTOUR | HAIR STYLE | EYEBROWS | EYES | NOSE | MOUTH | UNDER-EYE WRINKLES | CHEEK WRINKLES | FOREHEAD WRINKLES |
| 1 | MALE | CHILD | ↑ | — | → | → | → | → | — | — | — |
| 2 | MALE | YOUNG | — | — | — | — | — | — | — | — | — |
| 3 | MALE | MATURE | — | — | — | — | — | — | ○ | ○ | — |
| 4 | MALE | OLD | ↑ | — | ← | ← | ↕ | → | ○ | ○ | ○ |
| 5 | FEMALE | CHILD | — | — | ↕ | ↕ | — | — | — | — | — |
| 6 | FEMALE | YOUNG | — | — | → | → | — | — | — | — | — |
| 7 | FEMALE | MATURE | — | — | — | — | — | — | ○ | ○ | — |
| 8 | FEMALE | OLD | — | — | — | — | — | → | ○ | ○ | ○ |

44

↑ ···· RAISE THE APPROPRIATE PART BY n DOTS IN THE X DIRECTION
↓ ···· LOWER THE APPROPRIATE PART BY n DOTS IN THE Y DIRECTION
↕ ···· LOWER THE APPROPRIATE PART BY (n×2) DOTS IN THE X DIRECTION
○ ···· ADD THE APPROPRIATE PART

FIG.14
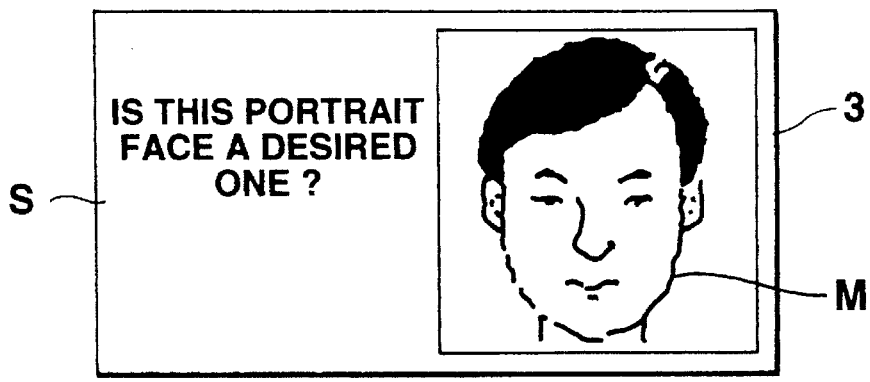
IS THIS PORTRAIT FACE A DESIRED ONE ?
FIG.15
44A
| PLAIN | — — — — | SYNTHESIS POSITION IS NOT ADJUSTED |
|---|---|---|
| GENTLE-LOOKING | — — — — | MOVE EYES AND EYEBROWS n DOTS AWAY FROM EACH OTHER |
| FEARFUL-LOOKING | — — — — | MOVE RIGHT AND LEFT EYES m DOTS AWAY FROM EACH OTHER, MOVE EYES AND EYELIPS n DOTS CLOSER TO EACH OTHER |
FIG.16
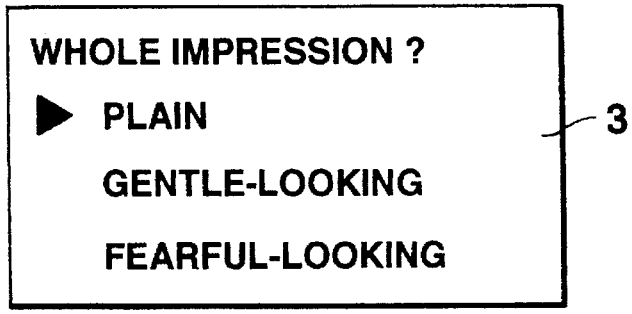
WHOLE IMPRESSION ?
▶ PLAIN
　 GENTLE-LOOKING
　 FEARFUL-LOOKING

FIG.17

| PART | CHARACTERISTIC | PART IMAGE NO. |
|---|---|---|
| CONTOUR | LONG | 1, 3, 8, 9, ⋯ |
| | TRIANGULAR | 2, 4, 8, 12, ⋯ |
| | ROUND | 2, 5, 6, 7, ⋯ |
| HIAR STYLE | PARTED AT THE SIDE | 1, 2, 3, 4, ⋯ |
| | SHORT | 5, 6, 7, 8, ⋯ |
| | COMBED-BACK | 9, 10, ⋯ |

CONTOUR ?
　　LONG
▶ TRIANGULAR
　　ROUND
— 3

FIG.19B

HAIR STYLE ?
▶ PARTED AT THE SIDE
　　SHORT
　　COMED-BACK
— 3

FIG.19C

EYES ?
　　BIGGER
　　SMALLER
▶ NARROW
— 3

FIG.20

| PART | GROUP | EXPRESSION | | | |
|---|---|---|---|---|---|
| | | NORMAL | SMILING | ANGRY | CRYING |
| EYEBROWS | THIN EYEBROWS | 1, 13 | 3 | 6 | 10 |
| | THICK EYEBROWS | 5 | 7, 15 | 8, 14 | 12 |
| | DARK EYEBROWS | 2 | 4 | 9 | 11 |
| EYES | BIGGER EYES | 1 | 3 | 4 | 5 |
| | SMALLER EYES | 6 | 7 | 8 | 9 |

FIG.26

| NO. | PART \ IMAGE NO. | 01 | 02 | | 20 |
|---|---|---|---|---|---|
| 1 | CONTOUR | | | | |
| 2 | HAIR STYLE | | | | |
| 3 | EYES | | | | |
| 4 | NOSE | | | | |
| 5 | MOUTH | | | | |
| 6 | EYEBROWS | | | | |
| 7 | GLASSES | | | | |
| 8 | UNDER-EYE WRINKLES | | | | |
| 9 | FOREHEAD WRINKLES | | | | |
| 10 | NOSE WRINKLES | | | | |
| 11 | MOUSTACHE | | | | |
| 12 | BEARD | | | | |

BASIC PART IMAGES: rows 1–6

SUBSIDIARY PART IMAGES: rows 7–12

|  | FRONT FACE |
|---|---|
| CONTOUR | 01 |
| HAIR STYLE | 08 |
| EYES | 14 |
| NOSE | 01 |
| MOUTH | 01 |
| EYEBROWS | 06 |
| GLASSES | 01 |
| UNDER-EYE WRINKLES | 02 |
| FOREHARD WRINKLES | NONE |
| NOSE WRINKLES | NONE |
| MOUSTACHE | NONE |
| BEARD | NONE |

FIG.28

| SUBSIDIARY PART IMAGE | BASIC PART IMAGE | DEVIATION IN POSITION BETWEEN SUBSIDIARY AND BASIC PART IMAGES |
|---|---|---|
| GLASSES-1 | EYES-1 | x, y |
| | EYES-2 | x, y |
| | ⋮ | ⋮ |
| | EYES-20 | x, y |
| GLASSES-2 | EYES-1 | x, y |
| | EYES-2 | x, y |
| | ⋮ | ⋮ |
| | EYES-20 | x, y |
| ⋮ | ⋮ | ⋮ |
| MOUSTACHE | CONTOUR-1 | x, y |
| | CONTOUR-2 | x, y |
| | ⋮ | ⋮ |
| | CONTOUR-20 | x, y |

FIG.33

| SUBSIDIARY PART IMAGE | BASIC PART IMAGE | AMOUNT OF DEVIATION IN SYNTHESIS POSITION |
|---|---|---|
| GLASSES | EYES | x, y |
| UNDER-EYE WRINKLES | EYES | x, y |
| FOREHEAD WRINKLES | EYEBROWS | x, y |
| NOSE WRINKLES | NOSE | x, y |
| MOUSTACHE | MOUTH | x, y |
| BEARD | CONTOUR | x, y | ns
IMAGE CREATION DEVICE

BACKGROUND OF THE INVENTION

The present invention relates to image creation devices which create a target image by selecting and combining any ones of part images of a complete image prepared beforehand.

Conventionally, image creation devices are known which sequentially select any part images one for each of parts (a contour, a hair style, eyes, etc.) of a face from among a storage which contains data on a plurality of part images for each of the parts of the face, dispose the selected part images at corresponding predetermined coordinate positions, and combine such part images into a target image.

Therefore, in such devices, the process for creation of the target image is complicated and takes much time, undesirably.

Even when the user desires to create a target image or an image close to the former, the part images selected by the user are required to be disposed at the corresponding coordinate positions predetermined in an image synthesis storage. Thus, even though the respective part images are optimal ones, the coordinate positions where they are disposed are fixed at all times. Thus, when the synthetic image composed of combined part images is viewed as a whole, it can be different from the target which the user desires to create.

In addition, when one target image is to be created by combining the respective part images in the conventional image creation device, a discrepancy such as an overlap or a separation can be produced at the boundary between adjacent part images in dependence on a combination of those part images.

It is therefore an object of the present invention to provide an image creation device which is capable of creating a target image or an image close to the former rapidly and easily.

It is another object of the present invention to provide an image creation device which, when a target image is synthesized from a plurality of part images, is capable of synthesizing the plurality of part images in an appropriate positional relationship, irrespective of the kinds of part images to be synthesized.

SUMMARY OF THE INVENTION

In order to achieve those objects, in one aspect, the present invention provides an image creation device including:

part image storage means which contains a plurality of part images which constitute a complete image;

selection means for selecting part images which constitute a desired image from among the plurality of part images stored in the part image storage means;

attribute setting means for setting an attribute of the desired image;

synthesis means for disposing at least one of the plurality of part images selected by the selection means at a position depending on an attribute set by the attribute setting means to synthesize a target image from the selected part images; and output means for outputting the synthesized target image.

According to this image creation device, by the user's sole setting of the attributes (for example, sex, age, impression) of the target image, the respective part images of the target image are disposed adjustably at positions depending on the attributes. Thus, the target image matching with the set attributes is created appropriately, rapidly and easily.

In another aspect, the present invention provides an image creation device including:

part image storage means which contains a plurality part images which constitutes a complete image;

positional deviation storage means for storing data on positional deviations between disposed part images;

selection means for selecting at least two part images from among the plurality of part images stored in the part image storage means;

disposition and synthesis means for disposing the selected at least two part images at positions depending on the data on positional deviations stored in the positional deviation storage means and synthesizing a target image from the disposed at least two image; and output means for outputting the target image of the at least two part images disposed and synthesized by the disposition and synthesis means.

According to this invention, at least two part images selected by the selection means are disposed at positions depending on positional deviation data stored in the positional deviation data storage means. Thus, the part images are disposed in an appropriate positional relationship without requiring any special creating techniques. Therefore, for example, when an "eyes" image and a "glasses" image are synthesized, an unnecessarily large overlap or separation of the respective boundaries of those part images which would otherwise occur is prevented. Thus, both adjacent part images are combined in an appropriate positional relationship to rapidly and surely create the target image which gives a natural impression.

BRIEF DESCRIPTION OF THE DRAWINGS

FIG. 3 illustrates the respective part images of a portrait image, data on which is stored in a part image ROM of FIG. 2;

FIG. 4 shows the structure of a data RAM of FIG. 2;

FIG. 7 Shows one example of data stored in a position data ROM;

FIG. 14 shows one example of a display screen which shows a created portrait image and a message which asks whether the created image is satisfactory;

FIG. 15 illustrates the relationship of impressions as attributes to corresponding synthesis positions of the respective part images in order to illustrate a second embodiment of the present invention;

FIG. 16 shows one example of a display screen which urges the user to set an impression as an attribute;

FIG. 17 shows one example of classification data which includes characteristics of the respective part images and corresponding numbers indicative of those part images in order to illustrate a third embodiment of the present invention;

FIGS. 19A–19C each show one example of a display screen which urges the user to select one of characteristics of a part image;

FIG. 20 illustrate numbers indicative of corresponding part images classified in accordance with expression in order to illustrate a fourth embodiment of the present invention;

FIG. 26 shows one example of data stored in the part image ROM of FIG. 25;

FIG. 27 shows one example of data stored in the part RAM of FIG. 25;

FIG. 28 shows one example of data stored in a part relation table of FIG. 25;

FIG. 33 shows a modification of data stored in the part relation table.

DESCRIPTION OF THE PREFERRED EMBODIMENTS

First Embodiment

A foldable portrait image creation device as a first embodiment of the present invention will be described below with respect to the drawings.

Figure 1:
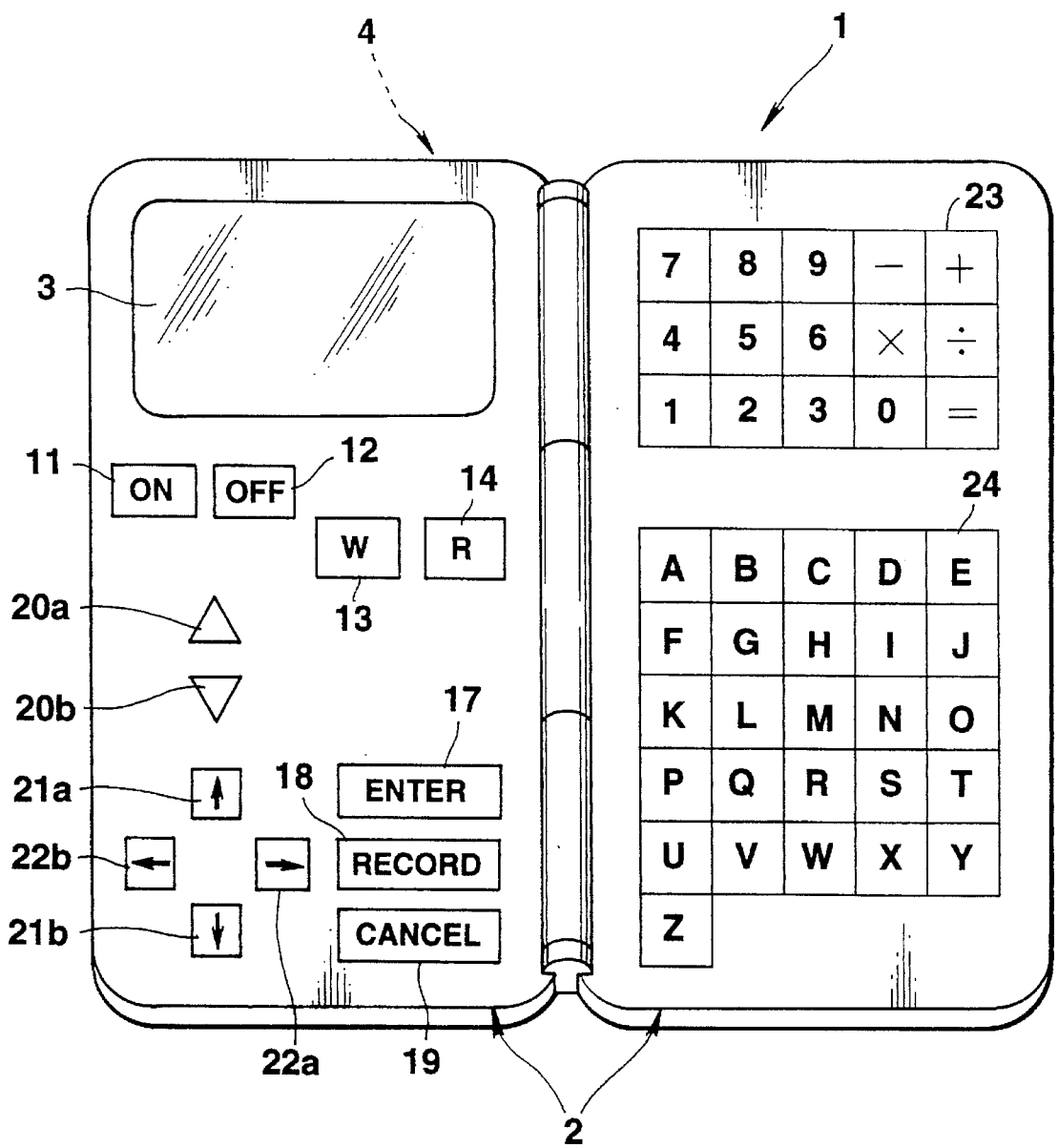
FIG. 1 shows the layout of outer elements of a portrait image creation device as a first embodiment of the present invention.

FIG. 1 shows the appearance of the portrait image creation device 1 as the first embodiment. In FIG. 1, the portrait image creation device 1 is composed of an input unit 2, a display 3, and an internal unit 4.

The input unit 2 includes a power switch on key 11, a power switch off key 12, a write (W) key 13, a read (R) key 14, an enter key 17, a record key 18, a cancel key 19, an up selection key 20a, a down selection key 20b, an upward arrow key 21a, a downward arrow key 21b, a rightward arrow key 22a, a leftward arrow key 22b, a ten-key unit 23, and an alphabetic key unit 24.

The power supply on and off keys 11 and 12 are used to respectively turn on and off a power supply when the portrait image creation device 1 is used.

Figure 2:
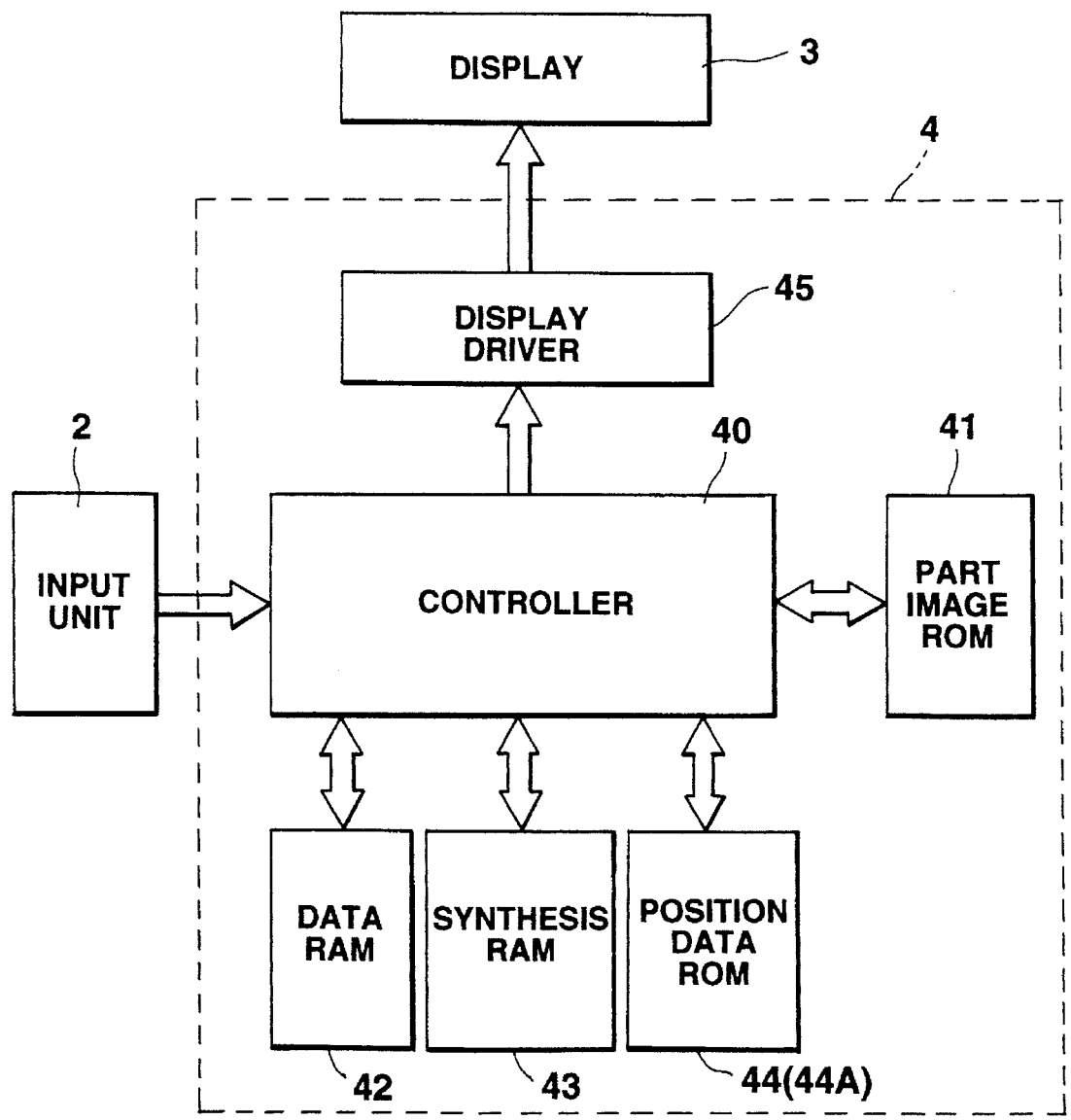
FIG. 2 is a block diagram of the circuit structure of the portrait image creation device.

The write key 13 is used to write individual data such as its name, address and telephone number into a data RAM 42 of FIG. 2. The read key 14 is used to read and display individual data stored in the data RAM 42.

The enter key 17 is used to fix a selected one of various items displayed on the display 3 in a portrait image creation process.

The record key 18 is used to fix and record a created portrait image in the portrait image creation process.

The cancel key 19 is used to cancel a created portrait image.

The up and down select keys 20a and 20b are used to select stored individual data when the data is read and displayed on the display 3.

The upward and downward arrow keys 21a and 21b are used to select one of various items displayed on the display 3 and to designate a part image to be changed, in the portrait creation process.

The rightward and leftward arrow keys 22a and 22b are used to change the respective part images of the portrait image in the portrait image creation process.

The ten-key unit 23 is composed of numeral keys "0"–"9" and arithmetic operation keys "–", "+". "×" and "÷" and keys in data indicated on its key pads.

The alphabetic key unit 24 is composed of alphabetic keys "A"–"Z" and keys in character data indicated on its key pads, like the ten-key unit 23.

The display 3 is composed of a liquid crystal display (LCD) which displays character and numeral data output from the internal unit 4 and displays a predetermined image on the basis of an image signal from the internal unit 4. More specifically, the display 3 displays an individual name, address, telephone number, portrait image, etc.

As shown in FIG. 2, the internal unit 4 is composed of a controller 40, a part image ROM 41, a data RAM 42, a synthesis RAM 43, a position data ROM 44, and a display driver 45.

The controller 40 is composed of a CPU, its peripheral circuits, a ROM which contains operating programs for the CPU, and controls the operation of the whole portrait image creation device 1.

As shown in FIG. 3, the part image ROM 41 contains, in the form of a bit map or a figure, data on each of a plurality of part images (each indicative of a part shape) for each of parts which compose a portrait image.

The data RAM 42 is used to store individual data stored in the portrait image creation device 1 and is composed of individual data storages DM1–DM50, a write position pointer I, a read position pointer P, and an input data register Q, as shown in FIG. 4.

The individual data storages DM1–DM50 each are capable of storing individual data for one person and hence they are capable of storing individual data for 50 persons in all. They are each composed of a name data storage, an address data storage, a telephone number data storage, a portrait data storage, and an attribute data storage.

The portrait data storage stores data on numbers each indicative of a part image selected for each of the parts "contour", "hair style", "eyebrows", "eyes", "nose", and "mouth" of a face; more particularly, a storage PN1 which stores a number indicative of a selected "contour" image, a storage PN2 which stores a number indicative of a selected "hair style" image, a storage PN3 which stores a number indicative of a selected "eyebrows" image, a storage PN4 which stores a number indicative of a selected "eyes" image, a storage PN5 which stores a number indicative of a selected "nose" image, and a storage PN5 which stores a number indicative of a selected "mouth" image.

The write pointer I is used to designate one of the individual data storages DM1–DM50 into which individual data is written.

The read pointer P is used to designate one of the individual data storages DM1–DM50 from which individual data is read.

The input register Q is used to temporarily store data received from the input unit 2 before the data is fixed.

Figures 5, 6:
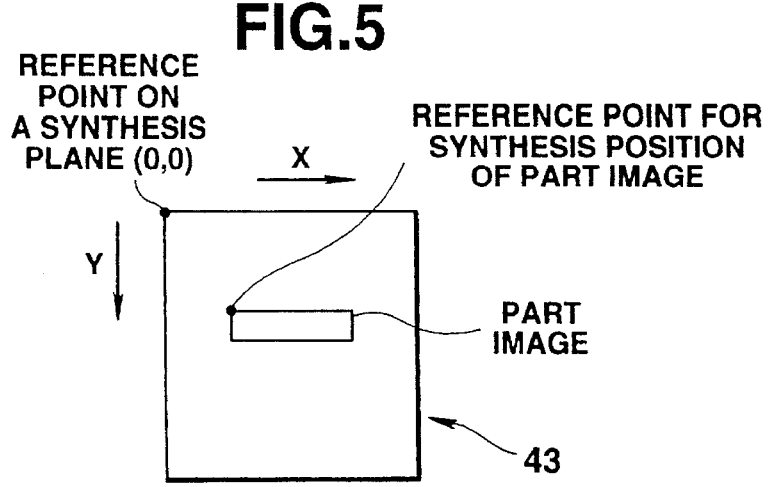
FIG. 5 illustrates the relationship of a synthesis plane in a synthesis RAM to a position where a part image is combined.
FIG. 6 illustrates a reference synthesis position for each of the parts of a portrait image.

The synthesis RAM 43 is composed of an X×Y bit map memory in correspondence to an X×Y dot portrait display unit as the display 3, which corresponds in bit to the synthesis RAM 43, where part images selected for the respective parts are disposed and synthesized in the form of a bit map, as shown in FIG. 5.

The position data ROM 44 beforehand contains, as reference synthesis positions, reference points for the synthesis positions of the respective part images, as shown in FIG. 6, when the respective part images are disposed and synthesized in the synthesis RAM 43.

The display driver 45 converts various display data output from the controller 40 and including image data in the synthesis RAM 43 into image signals displayable on the display 3 and outputs the image signals.

In operation, the portrait image creation device 1 as the first embodiment has the functions of storing various data such as many persons' names, addresses, telephone numbers, and portrait images and reading and displaying those data, as required.

Figure 8:
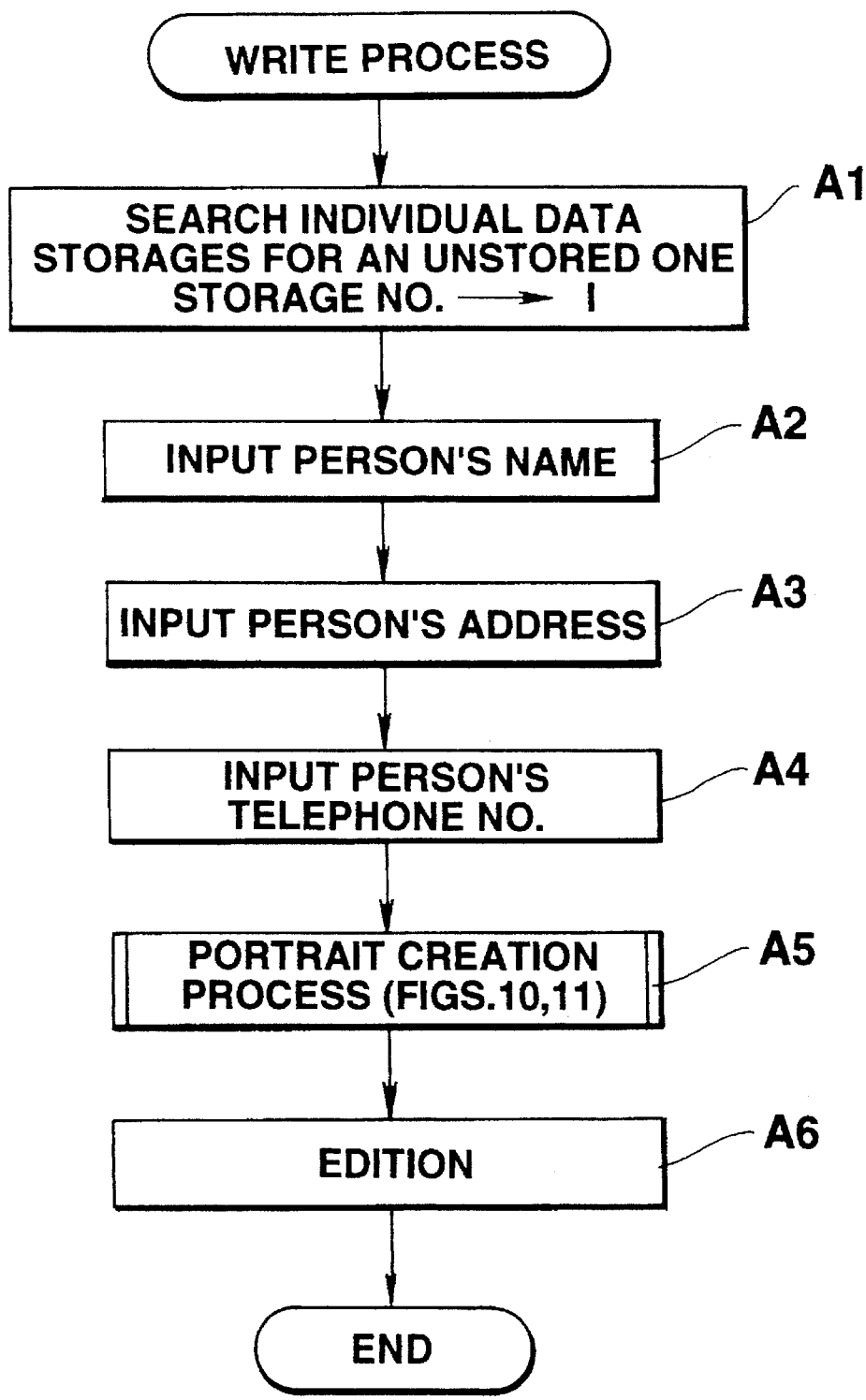
FIG. 8 is a flowchart indicative of a write process performed in the first embodiment of the present invention.

In order to store data on a person's name, address and portrait image, the user operates the write key 13, whereupon the write process of FIG. 8 starts. First, the controller 40 searches the individual data storages MD1–MD50 for a one where no individual data is written and sets its number in the write position pointer I (step A1). When individual data has been set in all the individual data storages MD1–MD50, the controller 40 erases data stored in one of the individual data storages MD1–MD50 and writes data thereinto.

Person's name, address and telephone number data are sequentially input by the ten-key unit 23, and alphabetic key unit 24 (steps A2–A4). They are stored in an individual data storage DMI designated by the write position pointer I.

Figure 10:
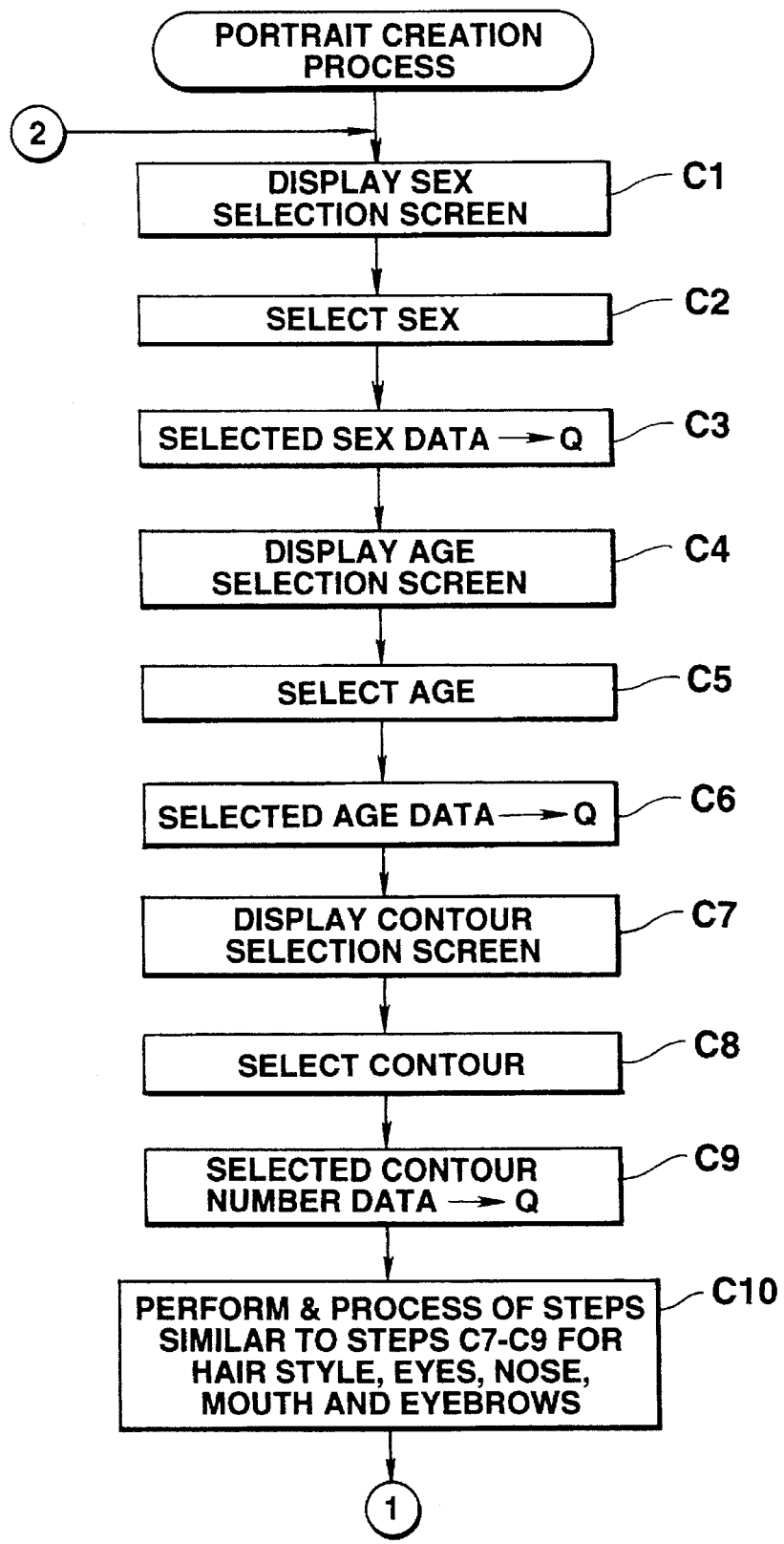
FIG. 10 is a flowchart indicative of the details of the former half of a portrait image creation process of FIG. 8.
Figure 11:
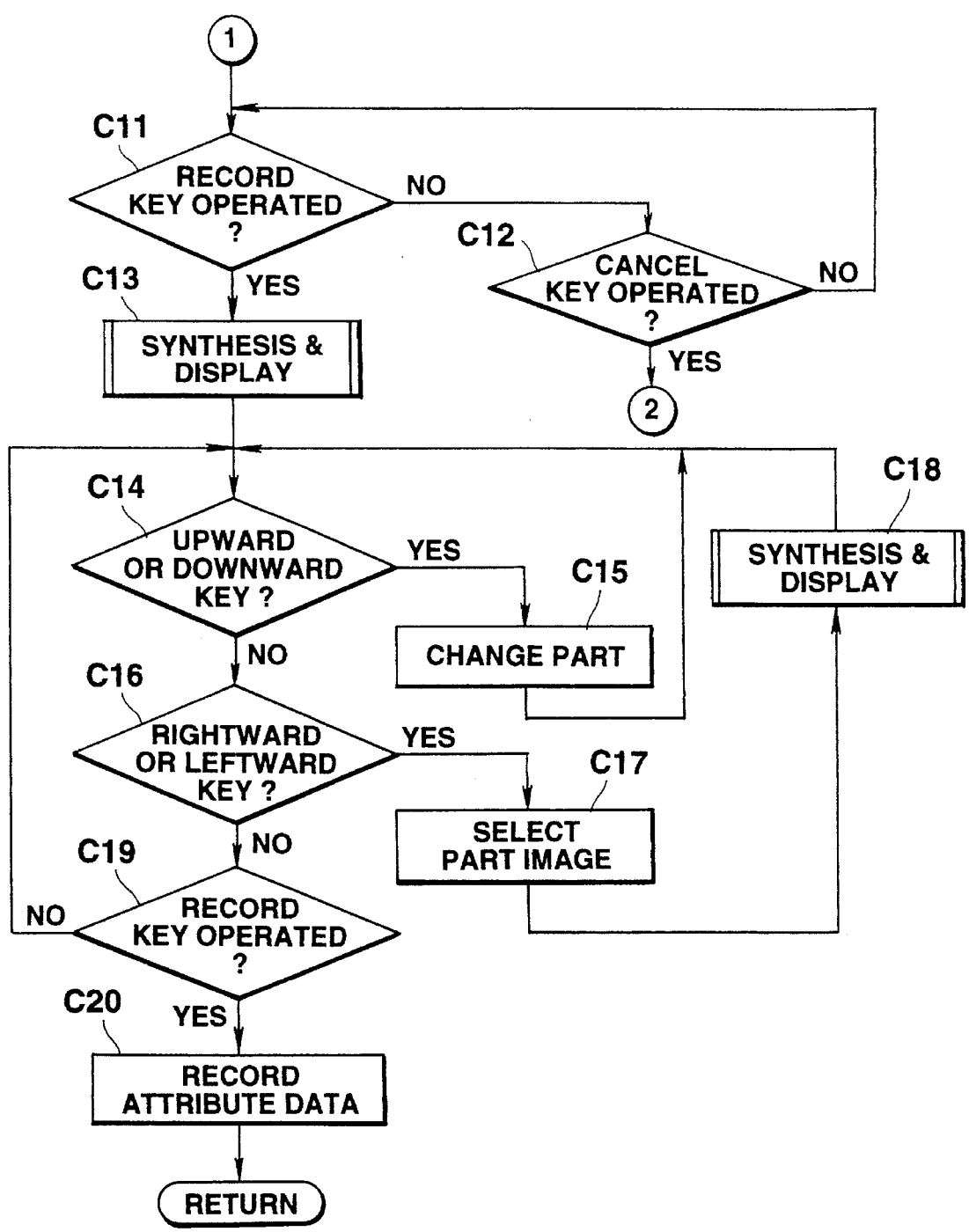
FIG. 11 is a flowchart indicative of the details of the latter half of the portrait image creation process of FIG. 8.

Thereafter, the controller 40 performs a portrait image creation process for creation of a portrait image (step A5), which will be described later in more detail. In this process, the controller 40 stores data on numbers indicative of the respective part images of the portrait image in the portrait data storage of the individual data storage DMI. The controller 40 also stores corresponding attribute data in the attribute storage. The portrait image creation process will be described later in detail with respect to FIGS. 10 and 11.

After this process, the controller 40 sorts a plurality of individual data stored in the individual data storages DM1–D50M so as to be arranged in an alphabetic order of individual names and ends the write process (step A6).

Figure 9:
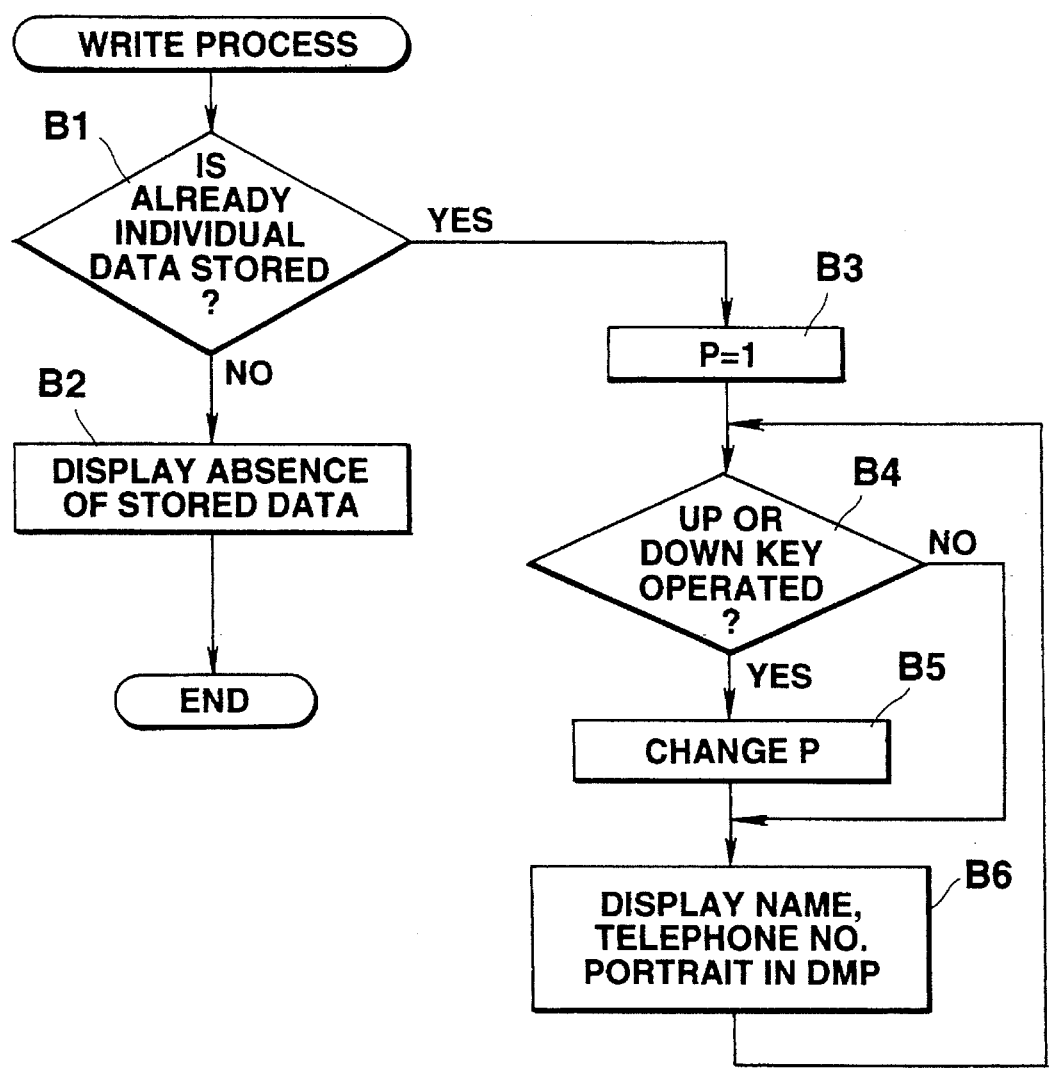
FIG. 9 is a flowchart indicative of a read process performed in the first embodiment of the present invention.

When individual data stored in the individual data storages DM1–D50M is desired to be read and displayed, the user is required to operate the read key 14, whereupon the read process of FIG. 9 starts. In this process, the controller 40 determines whether individual data has been stored in the individual data storages DM1–D50M (step B1). If not, the controller 40 displays the absence of stored data on the display 3 and ends the read process (step B2).

When the controller 40 determines at step B1 that individual data is stored in the individual data storages DM1–D50M, it sets "1" indicative of the individual data storage DM1 in the read position pointer P (step B3).

The controller 40 then determines whether the up or down selection key 20a or 20b has been operated (step B4). If so, the controller 40 changes the value of the read position pointer P to designate individual data on the next or last name in the alphabetic order (step B5).

When the controller 40 then determines at step B4 that none of the up and down select keys 20a and 20b has been operated, or when the controller 40 updates the value of the read position pointer P at step B5, it displays on the display 3 the individual data (on the name, address and telephone number) in the individual data storage DMP designated by the read position pointer P (step B6).

In addition, the controller 40 synthesizes a portrait image on the basis of the respective part images numbers, data on which is stored in the portrait data storage, and displays the portrait image on the display 3. When the controller 40 creates the portrait image, it adjusts the positions where the respective part images are synthesized in accordance with attributes, data on which is stored in the attribute storage, and adds subsidiary part images, as will be described later in more detail.

After the display at step B5, the control returns to step B5, where the controller 40 iterates the processing at step B4 and subsequent steps.

The portrait image creation process performed at step A5 of FIG. 8 will be described below in more detail with respect to FIGS. 10–13.

Figure 12A:
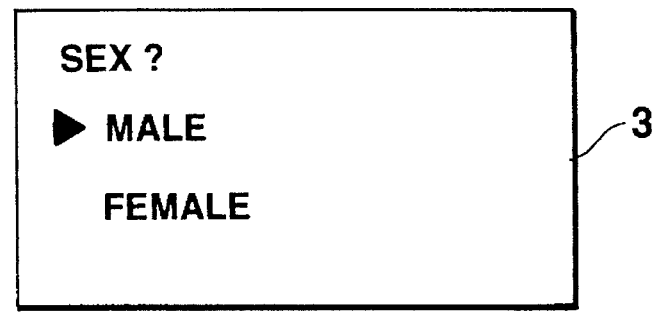
FIG. 12A shows one example of a display screen which urges the user to set a sex as an attribute.

In order to set an attribute of a portrait image to be created, the controller 40 displays on the display 3 a display screen which asks a portrait's sex of FIG. 12A on the basis of question data preset in the controller 40 (step C1). The user operates the upward and downward arrow keys 21a and 21b and the enter key 17 to select an appropriate sex (step C2). The controller 40 sets data on the selected sex in the input data register Q (step C3).

Figure 12B:
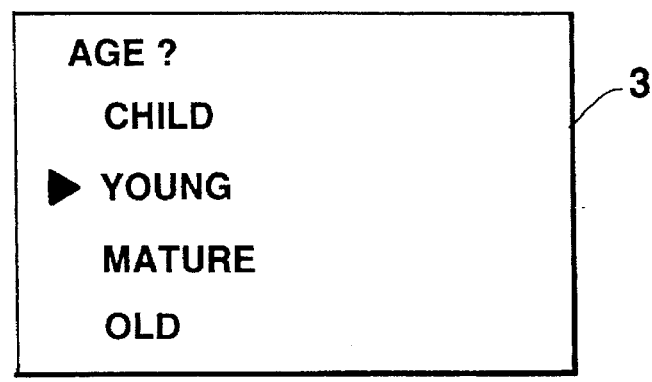
FIG. 12B shows one example of a display screen which urges the user to set an age as an attribute.
Figure 13:
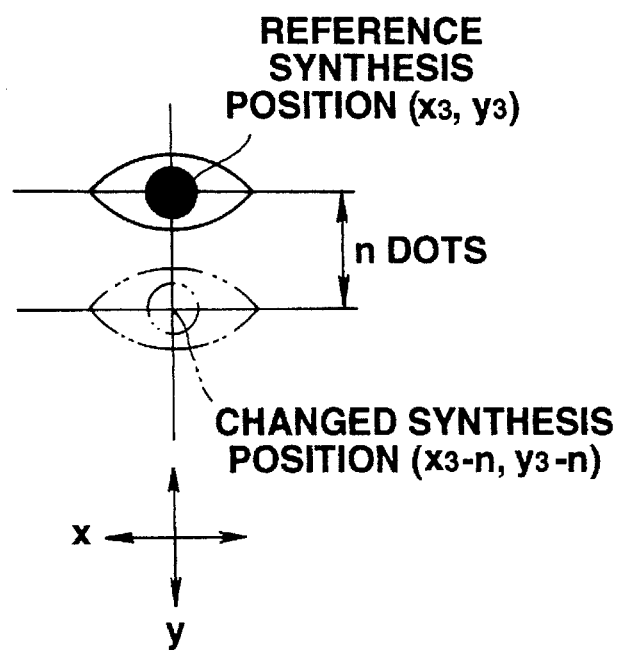
FIG. 13 shows an example of a part (eyes) image disposed n dots below the reference synthesis position.

The controller 40 displays through the display driver 45 on the display 3 a display screen which asks a portrait's age class of FIG. 12B (step C4). The user operates the upward and downward arrow keys 21a and 21b and the enter key 17 to select an appropriate age (step C5). The controller 40 sets data on the selected age in the input data register Q (step C6). Thus, setting of the attributes ends.

In order to select the respective images of the parts which constitute the portrait image, the controller 40 displays through the display driver 45 on the display 3 a display screen which urges the user to select a contour image (step C7). The user operates the rightward and leftward arrow keys 22a and 22b and the enter key 17 to select an appropriate part image from among the contour images stored in the part image ROM 41 (step C8). The controller 40 sets data on a number indicative of the selected contour image in the input data register Q of the data RAM 42 (step C9).

Similarly, the controller 40 sequentially displays through the display driver 45 on the display 3 display screens which urge the user to select hair style, eyes, nose, mouth and eyebrows images. Thus, the user operates the rightward and leftward arrow keys 22a and 22b and the enter key 17 to select appropriate part images, so that the controller 40 sets numbers indicative of the selected part images in the input register Q (step C10).

Thereafter, the controller 40 determines whether the record key 81 has been operated (step C11). If not, the controller 40 determines whether the cancel key 19 has been operated (step C12). If so, the control returns to step C1. If the cancel key 19 is not operated, control returns to step C11.

When the controller 40 determines at step C11 that the record key 18 has been operated, the control passes to step C13, where the controller 40 reads from the part image ROM 41 data on the respective images of the parts designated with data stored in the input data register Q, disposes and synthesizes the read part images in the synthesis RAM 43, as shown in FIG. 5, and displays the resulting synthetic image on the display 3 through the display driver 45.

The positions where the respective part images are synthesized are basically determined beforehand as reference synthesis positions for the respective part images, as shown in FIG. 6, in a range composed of X×Y dots within the synthesis RAM 43. When particular attributes are set at steps C1–C6, the controller 40 corrects (or adjusts) the positions where the respective part images are synthesized, as shown in FIG. 7, in accordance with the set attributes. Thus, for example, as shown in FIG. 6, when a particular attribute is set, the controller shifts the appropriate "eyes" image to a position which has deviated by amounts shown in FIG. 7 from the reference synthesis position of FIG. 6 for the eyes image which is at x3 (horizontally) and y3 (vertically), and combines the "eyes" image at that new position.

As shown in FIG. 7, if addition of a subsidiary part image has been designated in accordance with the set attribute, the controller 40 disposes and synthesizes the appropriate subsidiary part image at the appropriate position in the synthesis RAM 43.

The part image synthesis process performed at step C13 will be described next on the basis of a specified example.

When, for example, a sex=female and an age=mature are selected, the positions of the contour, hair style, nose and mouth images are not adjusted, but downward movement of the eyebrows and eyes images by n dots has been set, as shown in FIG. 7. In addition, addition of under-eye and cheek wrinkle images has been set as synthesis position data.

In accordance with such synthesis position data, the controller 40 disposes and synthesizes the contour, hairy style, nose and mouth images at the respective reference synthesis positions shown in FIG. 6 in the synthesis RAM 43. In addition, for the eyes and eyebrows part images, the controller 40 changes their synthesis positions to positions n dots below their reference synthesis positions of FIG. 6 in the synthesis RAM 43; for example, shifts the eyes image from its reference synthesis position shown by a solid line in FIG. 13 to a synthesis position shown by a dot-dashed line, and synthesizes the eyes image there. In addition, the controller 40 adds and synthesizes eyes and cheek wrinkle images to and at the reference synthesis positions of FIG. 6 in the synthesis RAM 43.

As shown in FIG. 14, the portrait image M composed of the respect part images synthesized in the synthesis RAM 43 is displayed, along with a message S which asks whether the portrait image M is a desired one, on the display 3 by the display driver 45.

When the user views the displayed portrait image to find that its particular part image is different from a desired one, she operates the upward or downward arrow key 21a or 21b to designate a part to be changed (steps C14, C15).

For example, if the eyes image of the displayed portrait image is different from a target one, the user operates the upward or downward arrow key 21a or 21b to designate eyes as a part to be changed (C14, C15).

Thereafter, the user operates the rightward or leftward arrow key 22a or 22b to select an appropriate part image (C16, C17) to thereby set data on a number indicative of the selected part image in the input data register Q.

The controller 40 once clears data in the synthesis RAM 43, disposes the respective part images in the synthesis RAM 43 in accordance with the updated data in the input data register Q, synthesizes a portrait image again from those part images, and displays the portrait image on the display 3 (step C18).

If the created displayed portrait image is satisfactory, the user operates the record key 18 to record data on attributes such as a sex, age, etc., stored in the input data register Q and data on the numbers indicative of the images of the parts (contour, hair style, eyes, nose, mouth, eyebrows) of the portrait image in the individual data storage DMI, as shown in FIG. 4 (steps C19, C20). Thus, the portrait image creation process at step A5 ends and the control passes to step A6 of the main routine of FIG. 8.

In the read process, at step B6 of FIG. 9, data on the attributes and data on the numbers indicative of the respective part images stored in the individual data storage DMP designated by the read position pointer P are read. A synthesis process similar to that described above is performed on the basis of those data, and the resulting portrait image is displayed on the display 3.

As described above, when a portrait image is created in the first embodiment, the respective part images selected by the user are synthesized at coordinate positions depending on the attributes including the set sex and age and part images depending on the set attributes are added automatically to the half-finished portrait image as requested. Thus, a portrait image identical or close to the target one is created in a simple operation. The created portrait image can be displayed as requested.

Second Embodiment

FIGS. 15 and 16 show a second embodiment of the present invention. While the respective synthesis positions of the part images are adjusted in accordance with objective attributes such as sex and age in the first embodiment, the synthesis positions of the respective part images are adjusted in accordance with subjective attributes in the second embodiment.

In the second embodiment, any one of three kinds of attributes "plain", "gentle-looking" and "fearful-looking" is settable, and the synthesis position of each of the part images is adjusted in accordance with the set attribute.

The basic portion of the outside layout and circuit structure of the portrait image creation device as the second embodiment is substantially the same as that of the first embodiment of FIGS. 1–6 except for a position data ROM 44A. Thus, further description of the structural portion of the first embodiment will be omitted.

The position data ROM 44A (FIG. 2) which contains data on the reference synthesis positions of the respective part images of FIG. 6 and data on designation of change and synthesis of the respective part images at positions corresponding to the attributes designated by the user, as shown in FIG. 15.

For example, the position data ROM 44A contains data which directs that when the attribute is "plain", no fine adjustment of the synthesis positions should be performed; when the attribute is "gentle-looking", the respective eyes and eyebrows images should be synthesized at positions remoter n dots from their reference synthesis positions; when the attribute is "fearful-looking", the respective eyes and eyebrows images should be synthesized at positions closer n dots from their reference synthesis positions, and the right and left eyes images should be synthesized at positions remoter m dots from their reference synthesis positions. The reference synthesis positions are the synthesis positions where the respective part images are synthesized when "plain" is set as an attribute.

In the second embodiment, the eyes image is composed of right and left eyes image halves which are synthesizable independent of each other.

A portrait creation process will be described next.

First, the controller 40 displays a display screen which urges the user to select one of attributes "plain", "gentle-looking" and "fearful-looking" which the user will receive from a whole target portrait image, as shown in FIG. 16, to set that attribute.

When the user selects one of the attributes in response to that request, data on the selected attribute or impression is set in the input data register Q.

The user then selects the respective part images on a dialogue basis in an operating manner similar to that employed in the first embodiment. In the present embodiment, the user herself sets the addition, removal or change of subsidiary images for wrinkles, for example.

When the selection of the part images ends and the user operates the record key 18, the selected part images are disposed and synthesized in the synthesis RAM 43.

At this time, for example, when "plain" is set as an attribute, the controller 40 disposes the respective part images at the reference synthesis positions of FIG. 6. When "gentle-looking" is set as an attribute, the controller 40 moves the respective eyebrows and eyes images away from their reference synthesis positions in the synthesis RAM 43 such that the synthesis position of the eyebrows image is n/2 dots above its reference position of FIG. 6 and that the synthesis positions of the eye image halves are n/2 dots below the reference position of FIG. 6. When "fearful-looking" is set as an attribute, the controller 40 moves the respective eyebrows and eyes images closer to each other from their reference synthesis positions in the synthesis RAM 43 such that the synthesis position of the eyebrows images is n/2 dots below its reference position of FIG. 6 and that the synthesis positions of the eye image halves are n/2 dots above their reference position of FIG. 6, and also moves the right and left eye image halves away from their reference positions in the synthesis RAM 43 such that the synthesis position of the left eye half image is m/2 dots left from its reference synthesis position, and that the synthesis position of the right eye image half is m/2 dots right from its reference synthesis position.

Thereafter, the controller 40 displays on the display 3 the portrait image formed on the synthesis RAM 43. As in the first embodiment, when the user views the displayed image to find that a particular part image is different from the target one, the user operates the upward and downward arrow keys 21a and 21b to designate the particular part image and to operate the rightward and leftward arrow keys 22a and 22b to change that part image to a desired one.

When a satisfactory portrait image is created, the user operates the record key 18 to thereby record in the individual data area DMI the attribute data and number data indicative of the part images which constitute the portrait image and hence end the portrait image creation process.

In the read process, as in the first embodiment, individual data, the controller 40 reads attribute data and number data indicative of the respective part images from the individual data area DMP. The synthesis positions of the part images are finely adjusted on the basis of the read attribute data, as shown in FIG. 15, and disposed and displayed in the synthesis RAM 43.

As described above, in the second embodiment, part images are disposed at positions depending on attributes each composed of a subjective element, so that a portrait image giving an impression depending on the attributes is synthesized and displayed in a simple operation.

Third Embodiment

Figure 18:
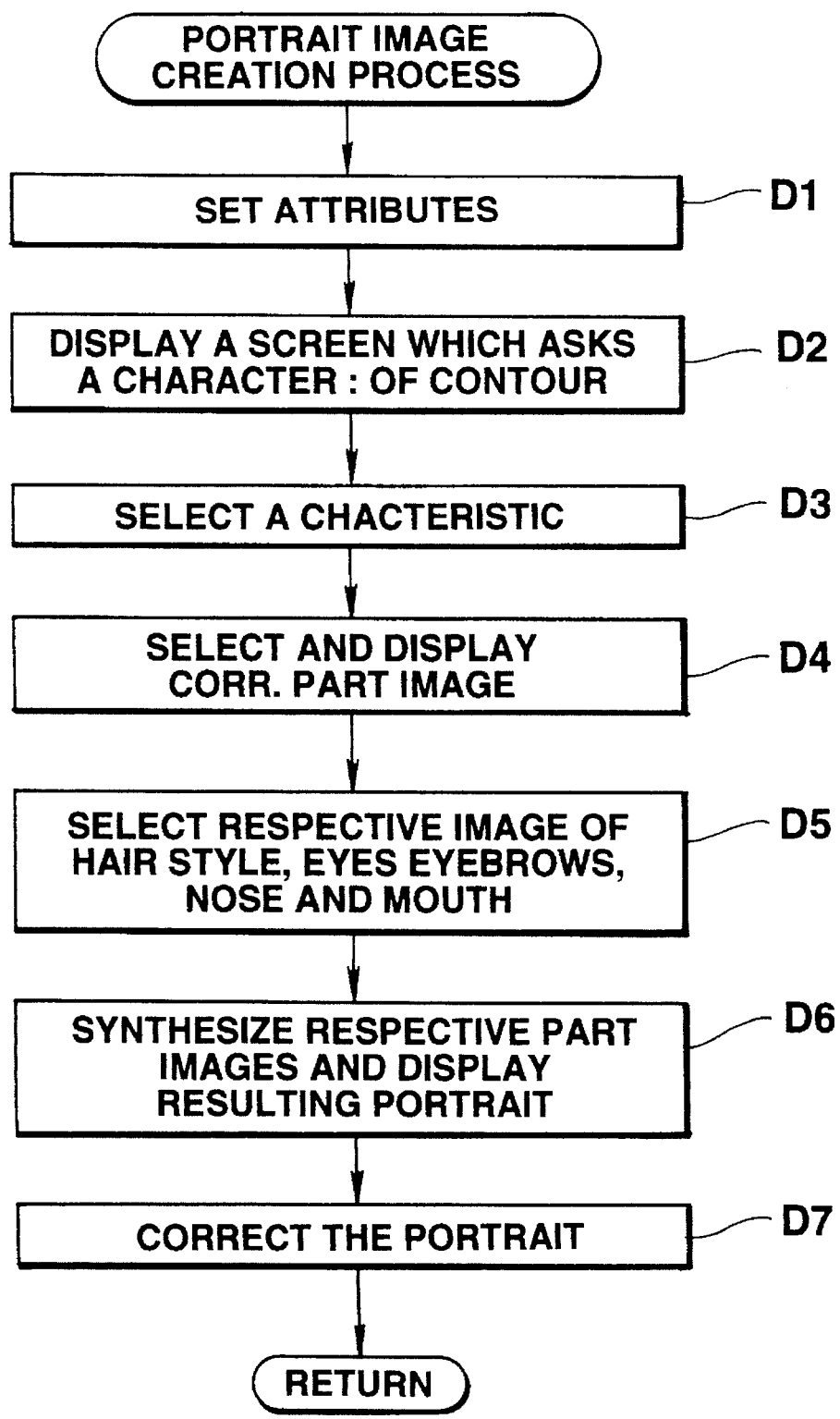
FIG. 18 is a flowchart indicative of a portrait image creation process performed in the third embodiment of the present invention.

FIGS. 17–19 show a third embodiment of the present invention. In the first and second embodiments, the user is required to select the respective part images by operating keys, which can take much time.

Thus, the third embodiment provides a dialogue type portrait image creation device in which when the user designates a feature or kind of a part image to be selected, a candidate part image is selected automatically and indicated to the user.

The portrait image creation device as the third embodiment has substantially the same outside layout and circuit structure as those of FIGS. 1–6 except that a part image ROM 41A of the third embodiment is partially different from the part image ROM 41 (FIG. 2). More specifically, the part image ROM 41A of the third embodiment contains classification data which contains data on the part images of the first embodiment of FIG. 3, data on characteristics of the respective part images and data on numbers indicative of those part images, as shown in FIG. 17. In the example of FIG. 17, the part image ROM 41A contains data on "long", "triangular", and "round" as the characteristics of the contour and data on numbers indicative of the corresponding part images.

In the third embodiment, data on sex, age and impression can be set as attributes, in contrast to the first embodiment.

A portrait image creation process performed by the portrait image creation device as the third embodiment will be described with respect to FIG. 18.

First, the controller 40 sets data on attributes of a portrait image to be created in a process similar to those employed in the first and second embodiments (step D1).

Thereafter, the controller 40 displays a display screen which asks a character or kind of a contour, for example, shown in FIG. 19A, in order to permit selection of the respective part images on a dialogue basis (step D2). When the user selects a character of the contour (step D3), the controller 40 refers to classification data stored in the part image ROM 41, selects a one having the highest priority from among the part images having that characteristic, and displays that part image on the display 3.

The user operates the rightward and leftward arrow keys 22a and 22b to sequentially change the part images until a desired part image is displayed. At this time, the controller 40 displays only a part image having a selected characteristic in accordance with classification data, at which time the user operates the enter key 17 to fix the contour image (step D4).

Similarly, the controller 40 sequentially displays display screens which ask selection of characteristics of the parts such as those shown in FIGS. 19B, 19C. In response to the request, the user selects appropriate images of the respective parts (step D5).

When the selection of the respective part images ends and the user operates the record key 18, a process for synthesis and display of the selected part images starts (step D6). At this time, the controller 40 adjusts the synthesis positions of the respective part images finely in accordance with the set attributes as in the first and second embodiments.

For example, when "female", "mature", and "gentle-looking" are set as attributes, the controller 40 disposes the eyebrows image n/2 (=n−n/2) dots below its reference synthesis position and the eyes image 3n/2 (=n+n/2) dots below its reference synthesis position in accordance with the position adjusted data of FIGS. 7 and 16. Thus, the eyes and eyebrows images give the impression that they are at positions low compared to their normal positions and further spaced from each other and hence a portrait image created gives the impression of a gentle-looking mature female. In addition, by adding under-eye and cheek wrinkle images for a mature female to the face image, the synthesis of the part images into a portrait image ends.

After the display of the synthesized portrait image on the display 3, the controller 40 partially corrects the portrait image as required as in the first embodiment (step D7), records in the data RAM 42 data on numbers indicative of the respective part images which constitute the corrected portrait image, and ends the portrait image creation process.

While in the above embodiment the display of the screens which ask the characteristics of the respective contour, hair style, eyebrows, eyes, nose and mouth images and the user's selection of appropriate characteristics have been shown and described, a request for selection of characteristics of the contour, eyebrows, nose and mouth images may be avoided, for example, by the operation of the upward and downward arrow keys 21a and 21b when the hair style and eyes images alone have characteristics.

In this case, the controller 40 selects a part image having the highest priority from among the part images having the set attributes (sex, age, etc.) as the contour, eyebrows, nose and mouth images and sets data on a number indicative of that part image.

According to such arrangement, sole designation of attributes and characteristics of any part leads to creation of a portrait image close to the target one.

In the first-third embodiments, the synthesis positions of the part images are adjusted and displayed in accordance with attributes. Alternatively, arrangement may be such that the respective part images are disposed at their reference synthesis positions of FIG. 5, and that a basic portrait image is synthesized in the synthesis RAM 43 and displayed on the display 3. Thereafter, in response to the user's predetermined key operations, the respective synthesis positions of the part images are adjusted in accordance with data of FIGS. 7 and 15, subsidiary part images are added as required and the resulting portrait image is displayed on the display 3. When a basic portrait image is displayed on the display 3, a message which asks whether the displayed portrait image is satisfactory may be displayed simultaneously.

According to such arrangement, both portrait images before and after adjustment of the position based on the attributes can be confirmed. Thus, operability is enhanced to thereby create a desired portrait image easily.

Fourth Embodiment

Figure 21A:
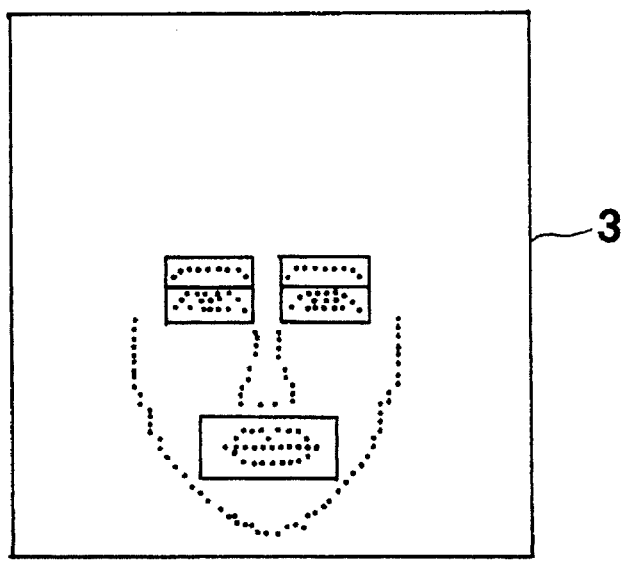
FIGS. 21A and 21B illustrate a portrait image having a normal expression and a portrait image having a smiling expression as a modification of the former expression, respectively.
Figure 21B:
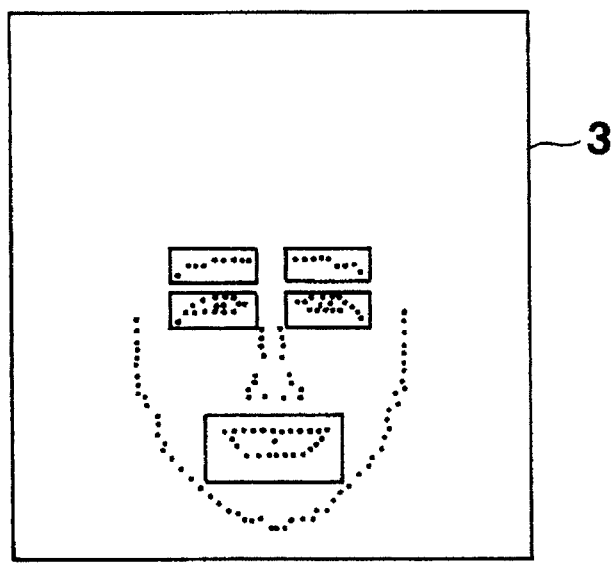

FIGS. 20, 21A, 21B show a fourth embodiment of the present invention.

In the first-third embodiments, the expression of a portrait image once created can not be changed. For example, if a portrait image having a smiling face is desired after a portrait image having an ordinary face has been created, the former portrait image is required to be created newly, which is troublesome.

The fourth embodiment provides a portrait image creation device which is capable of changing the expression of a created portrait image as required.

In the fourth embodiment, the input unit 2 includes an expression key unit (not shown) which is used to designate various expressions such as "smiling", "angry", "crying" ones.

A part image ROM 41 contains the part image data of FIG. 3, expression data, and relation data on the relation of the expression data to corresponding part image data.

For example, as shown in FIG. 20, in the relation data, the eyebrows images are classified into thin, thick, light and dark eyebrows groups, each of which has numbers indicative of eyebrows images having normal, smiling, angry, and crying expressions. For example, assume that a portrait image of FIG. 21A has been created, using the first-third embodiments.

When the user operates the expression key unit to designate a smiling face, for example, the controller 40 searches relation data (FIG. 20) contained in the part image ROM 41 to locate whether there is any part image having a smiling face in a group to which the set part image belongs, for each of the parts which constitute the face image. If so, the controller 40 reads data on a number indicative of the part image having a smiling expression in that group, and replaces the part image displayed now with that part image having a "smiling" expression.

Thus, for example, the eyes, eyebrows, and mouth images of the portrait image of FIG. 21A are replaced with those giving a smiling impression to thereby produce a portrait image giving a smiling impression of FIG. 21B.

When the expression is to be changed, not only the shapes of the part images may be changed but also disposition of the part images may be changed so as to give a more appropriate expression.

For example, when "smiling" is designated, an eyebrows image giving a smiling impression is disposed at a position one dot above its reference position and an eyes image giving a smiling impression is disposed at a position one dot below its reference position to thereby increase the spacing between the eyes and eyebrows images. When "angry" is designated, an eyes image giving an angry impression is disposed at a position one dot above its reference position and an eyebrows image giving an angry impression is disposed at a position one dot below its reference position to thereby reduce the spacing between the eyes and eyebrows images.

Alternatively, arrangement may be such that, for example, when a portrait image having a normal face has been set, and a "smiling" key is operated, the shapes of the part images alone are changed whereas when a portrait image having a smiling face has been set, and the "smiling" key is operated, the positions of the part images are finely adjusted to emphasize a smiling atmosphere.

No part images such as the hair style or nose image whose shape does not change greatly in dependence on a change in the feeling are required to be replaced. While the part images are classified into groups in the relation data of FIG. 20, and part images having a normal expression and a smiling expression are prepared for each group, the part images are not necessarily grouped.

Fifth Embodiment

FIGS. 22A, 22B, 23 and 24 show a fifth embodiment of the present invention.

Figure 22A:
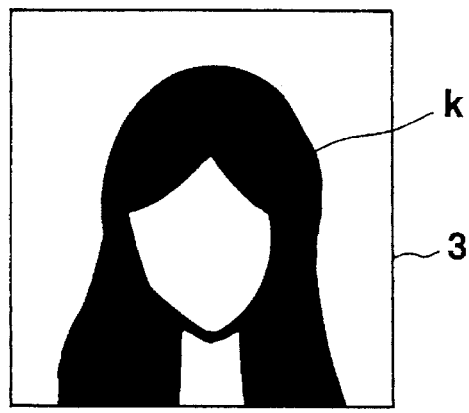
FIGS. 22A and 22B illustrate portrait images having hair styles which hide and expose her ears, respectively, in order to illustrate a fifth embodiment of the present invention.
Figure 22B:
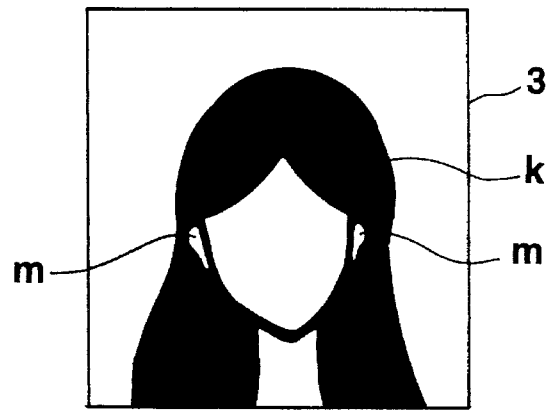

In the first-fourth embodiments, ear images are not prepared, but disposed as portions of a contour or hair style. Thus, as shown in FIGS. 22A and 22B, two hair style images, one having exposed ear images and the other having hidden ear images, are required to be prepared in dependence on the hair style used.

In this case, the capacity of the part image ROM 41 and the number of part images increase, and hence a part image is troublesome to select.

In the fifth embodiment, a portrait image creation device is provided which selects a portrait image having an exposed ear or hidden ear image as required, from ear images prepared beforehand, apart from the hair style and contour images to thereby create a portrait image.

Figure 23:
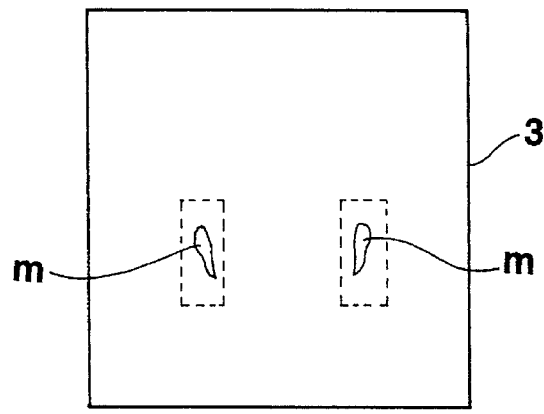
FIG. 23 illustrates ear images.
Figure 24:
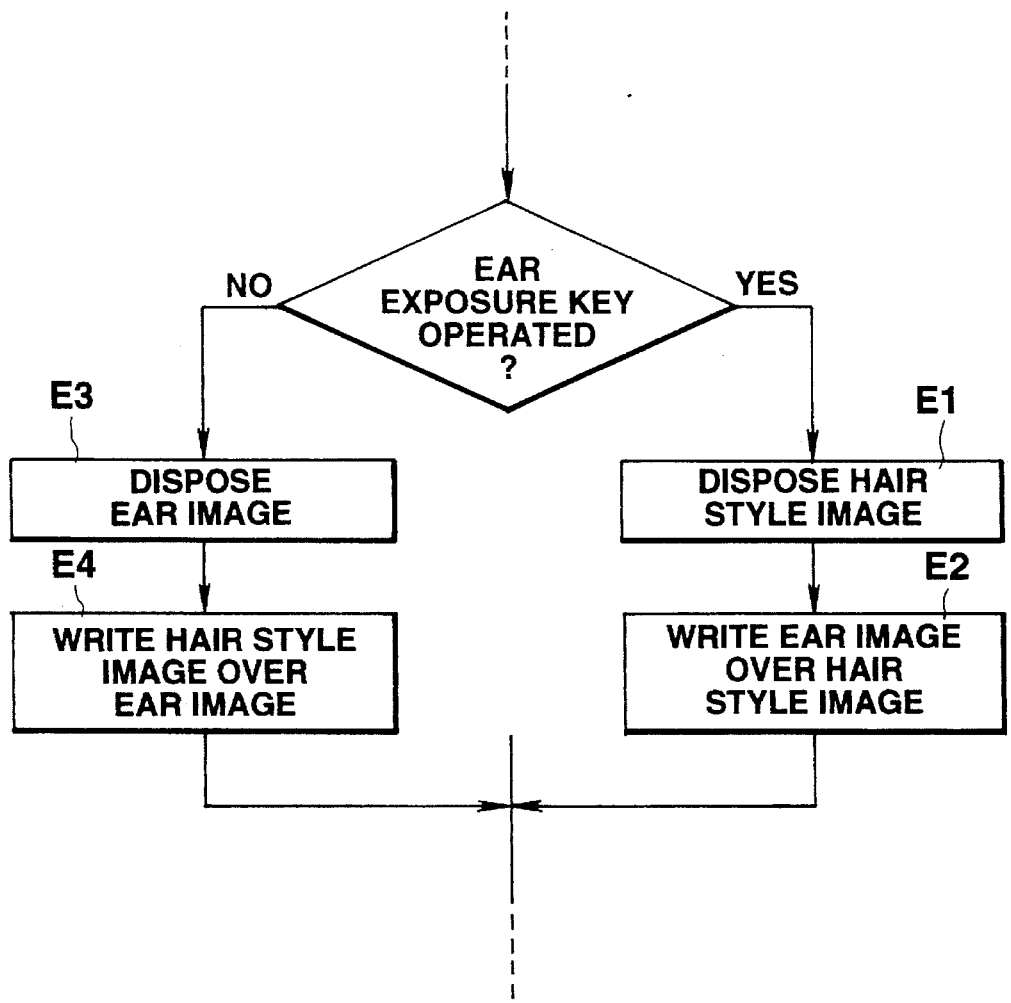
FIG. 24 is a flowchart indicative of a part image synthesis process performed in the fifth embodiment.

In the fifth embodiment, the part image ROM 41 contains data on ear images m of FIG. 23, for example. The input unit 2 includes an ear exposure key (not shown) used to designate creation of one of a portrait image having exposed ear images and a portrait image having hidden ear images.

As in the first-third embodiments, when the user creates a portrait image having exposed ear images after selection of the respective part images, she operates the ear exposure key whereas when the ear images are to be hidden, she operates not the ear exposure key, but the record key 18.

When the ear exposure key is operated, the control 40 first disposes an hair style image k in the synthesis RAM 43 (step E1 of FIG. 24) and then disposes dot data which constitutes the ear images m in the synthesis RAM 43 (step E2). At this time, the controller 40 determines whether the read dot data is within the contour of the ear images. If not, the controller 40 ORes the read dot data and the dot data stored at the synthesis position in the synthesis RAM 43 and writes the obtained data at the same position in the synthesis RAM 43. If the read dot data is inside the outline of the ear contour images, the controller 40 writes the read dot data over dot data stored at the synthesis position in the synthesis RAM 43.

Thus, when a hair style image k of FIG. 22A and ear images m of FIG. 23 are selected and the ear exposure key is operated, the synthesized portrait image exposes ear images, as shown in FIG. 22B.

When the record key 18 is operated without operating the ear exposure key, the controller 40 disposes the ear images m first in the synthesis RAM 43 (step E3) and writes the hair style image k over the ear image (step E4). Thus, the synthesized image has no exposed ear images, as shown in FIG. 22A.

As described above, according to the fifth embodiment, the ear image m is prepared, apart from the hair style and contour images, and it can be instructed whether a portrait image should have exposed ear images. Thus, a portrait image having a hair style image with exposed ear images and a portrait image having a hair style image with hidden ear images are not required to be prepared. Therefore, the capacity of the part image ROM 41 is reduced and data on many selectable expressions are stored.

While in the description the use of the hair style and ear images k and m, and writing one of them over the other have been illustrated as an example, this invention is applicable to a combination of any part images. For example, in the synthesis of the eyes image and glasses image, writing the eyes images over the glasses images or vice versa so that the eyes images appear in the glasses images may be selected in accordance with key operation.

The present invention is not restricted to the first-fifth embodiments, but modifiable in various form.

While, for example, in the above embodiments the part images are the figures of components of a human face image and a created image is a portrait image, the kind of part images and the kinds of created image are limitless. Alternatively, for example, an image creation device may be fabricated in which a plurality of part image data, one data item for each of parts of an animal's face, car or airplane, is selected from a like number of beforehand stored part image data for each of parts of the animal's face, car or airplane, and synthesized to form an image of that object having a desired shape.

The outside layout of FIG. 1 and the circuit configuration of FIG. 2 are only illustrative of the present invention. An image creation device having a structure different from that of each of the above embodiments may be employed so long as it can achieve functions similar to those mentioned above. The operation control shown in the flowcharts may be changed as required.

As described above, according to this embodiment, the synthesis or disposing positions of part images which constitute a target image to be created are adjusted in accordance with attributes of the target image. Thus, an appropriate target image is created depending on its attributes.

According to this embodiment, since the respective part images are selected on a dialogue basis, their selection is easily achieved.

According to this embodiment, attributes of a desired image and/or characteristics of the part images of the desired image are designated to display a candidate image. Thus, a complete image close to the desired image is created in a short time.

According to this embodiment, by designating a modification of a created image, at least one of the part images of the target image is changed or the synthesis positions of the part images are adjusted, so that the modification of the created image is easily created.

According to this embodiment, when a plurality of part images is synthesized at the same position, a part image to be handled preferentially or overwritten is designated. Thus, various expressions are achieved with the use of a small number of part images.

Sixth Embodiment

Figure 25:
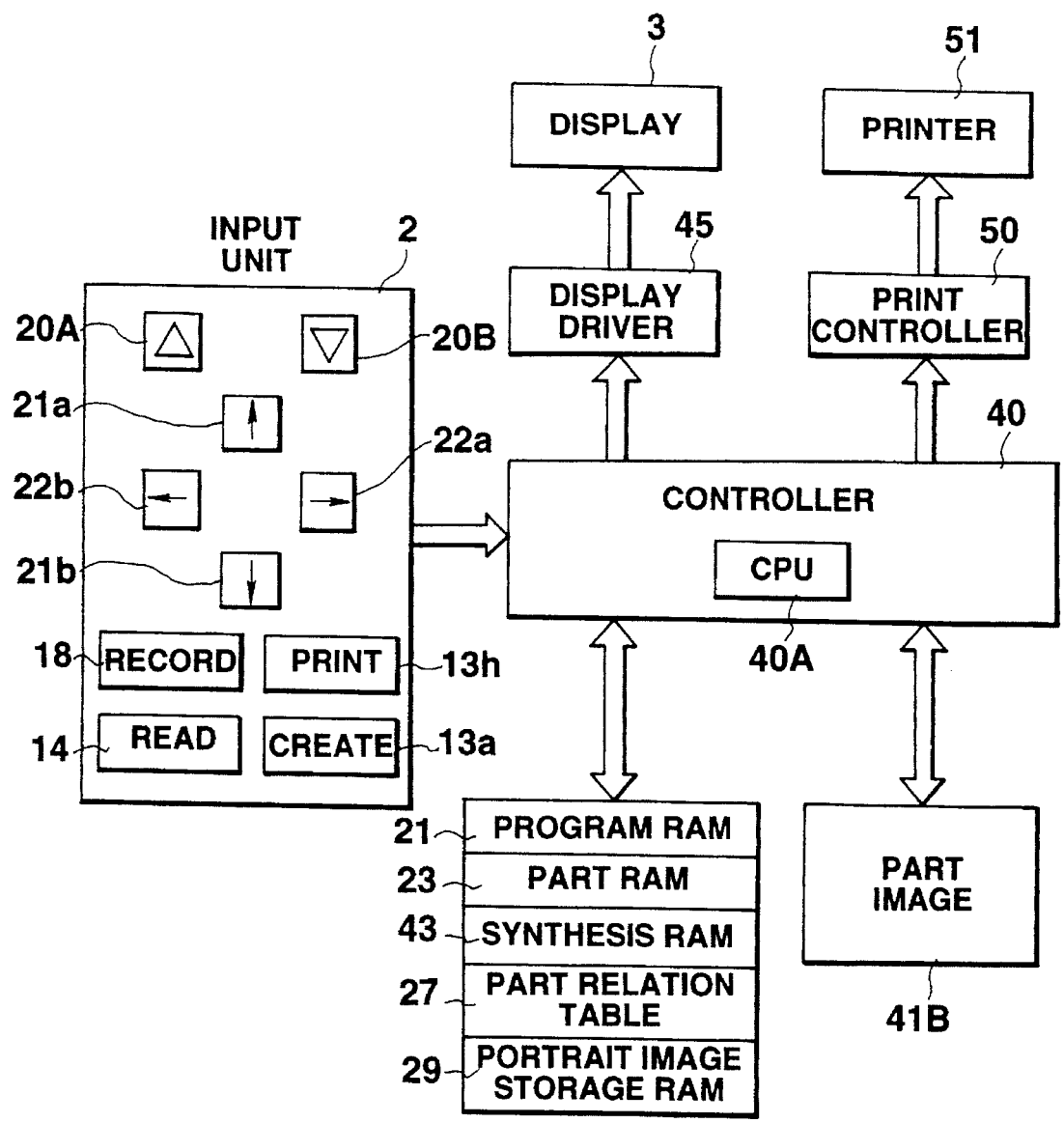
FIG. 25 is a block diagram of the structure of an image creation device as a sixth embodiment of the present invention.

FIGS. 25 and 33 show a sixth embodiment of the present invention. FIG. 25 is a block diagram of the circuit configuration of an image creation device as the sixth embodiment. The image creation device has the functions of combining a plurality of part images stored beforehand into a portrait image and outputting same, as in the first embodiment.

More particularly, the image creation device as the sixth embodiment includes an input unit 2, a display 3, a display driver 45, a controller 40, a synthesis RAM 43, a part relation table 27, a portrait image storage RAM 29, a part image ROM 41B, a print controller 50 and a printer 51, as in the first embodiment.

As in the first embodiment, the controller 40 controls the operations of the respective appropriate elements thereof on the basis of a key-in signal from the input unit 2 in accordance with the programs stored beforehand in a program RAM 21, which will be described later in more detail. The controller 40, for example, includes a CPU 40A and its peripheral circuits.

The input unit 2 includes a plurality of key switches used to deliver data to the controller 40. The input unit 2, for example, includes a portrait image create key 13a operated to set a portrait image creation mode, basic portrait image selection keys 20A, 20B operated to select a basic portrait image to be described later, part designation keys 21a, 21b operated to designate one of the parts which constitute the portrait image, part image selection keys 22a, 22b operated to select any one from among a plurality of part images for the designated part, a print key 13h operated to print the created portrait image, a record key 18 operated to record or store the created portrait image, and a read key 14 operated to read the recorded portrait image.

As shown in FIG. 26, the part image ROM 41B contains a plurality of part images for each of the parts which constitute a portrait image. In the present embodiment, the portrait image is synthesized from six first or basic part images which are directed to a face contour, a hair style, eyes, a nose, a mouth and eyebrows as the parts. The part image ROM 41B contains 20 part images (numbered "01"–"20") for each of the parts of the portrait image.

In addition, the part image ROM 4A contains data on subsidiary or second part images which are directed to glasses, under-eye wrinkles, forehead wrinkles, nose wrinkles, moustache, and beard as the subsidiary parts, annexed to the corresponding basic part images, such that those subsidiary part images may be synthesized with the corresponding basic part images as required.

The program ROM 21 contains programs for control of the operations of the controller 40, which is, for example, a data input program and a portrait creation program.

The part RAM 23 stores data on numbers indicative of the corresponding images of the parts which constitute a portrait image, as shown in FIG. 27, as in the portrait data storage (FIG. 4) of the first embodiment.

The part relation table 27 contains data on the positional relationship between the respective part images. More particularly, as shown in FIG. 5, part images are usually disposed and synthesized on the basis of coordinates on a synthesis plane in the synthesis RAM 43. When a portrait image is synthesized from the respective part images, it can give an unnatural impression in dependence on a combination of those selected disposed part images, for example, owing to a discrepancy between the positions where a reference eyes image and a subsidiary glasses image are combined.

In order to avoid such discrepancy, the part relation table 27 contains, as amounts of deviation in the x and y directions, the relationship between a reference point for a position where each of basic part images is disposed and a reference point for a position where a subsidiary part image corresponding to that basic part image is disposed, data on the reference and subsidiary part images being contained in the part image ROM 41B, as shown in FIG. 28.

Figure 29A:
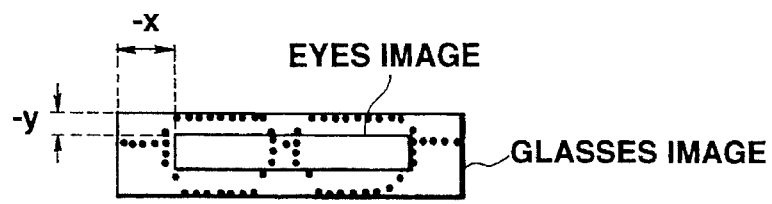
FIGS. 29A–29E each show the relationship between a reference position where each part image is disposed and a position where a subsidiary part image annexed to the former part image is disposed.

The respective amounts of deviation are determined experimentally, for example, as shown in FIGS. 29A–29E. FIG. 29A illustrates the positional relationship between a reference eyes image and a subsidiary glasses image annexed to the reference eyes image. For example, the amounts of deviation of the eyes and glasses images are determined such that the eyes image coincides in center with the glasses image.

Figure 29B:
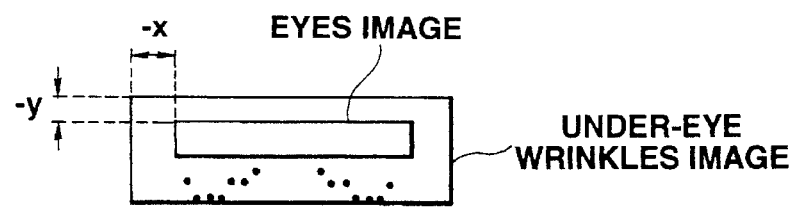

FIG. 29B illustrates the positional relationship between the reference eyes image and subsidiary under-eye wrinkle image. In this case, for example, their amounts of deviation are set such that an upper edge of the under-eye wrinkle image is somewhat below an lower edge of the eyes image.

Figure 29C:
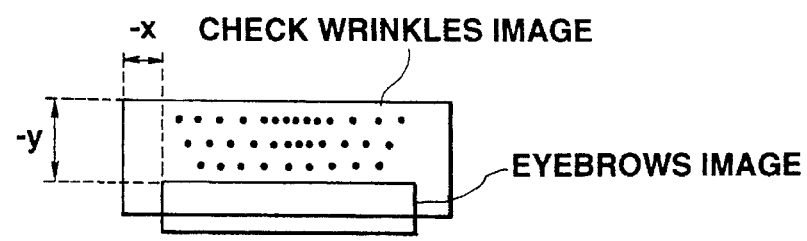
Figure 29D:
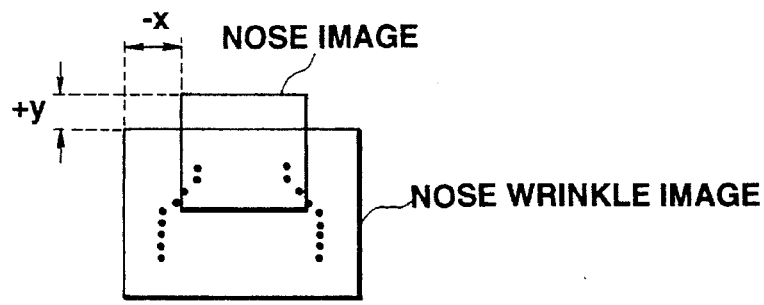
Figure 29E:
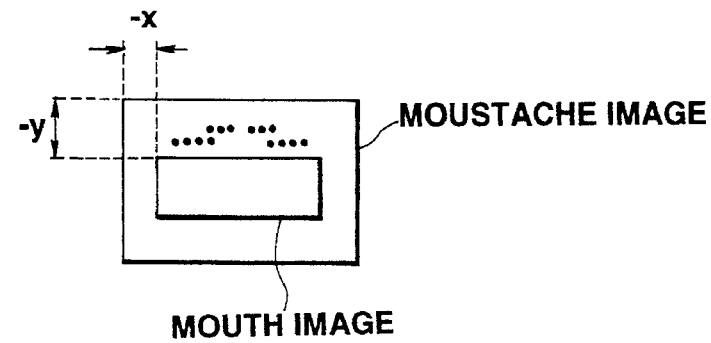

Similarly, FIG. 29C illustrates the positional relationship between the basic eyebrows image and its subsidiary forehead wrinkle image annexed to the basic eyebrows image. FIG. 29D illustrates the positional relationship between the basic nose image and its subsidiary nose wrinkle image. FIG. 29E illustrates the positional relationship between the basic mouth image and its subsidiary moustache image.

The portrait image storage RAM 29 stores data on numbers indicative of the part images of the created portrait image.

The print controller 50 controls the operation of a printer 51 under the control of the controller 40. The printer 51 is composed, for example, of a line printer.

The operation of the sixth embodiment will be described next. When the user operates the portrait image creation key 13a of the input unit 2, the controller 40 detects this key operation to start a portrait image creation process of FIG. 30.

First, the controller 40 initially sets, in the part RAM 23, "01" as numbers indicative of all the basic part images to be synthesized, "none" for their subsidiary part images, and "01" as a number indicative of the contour image to be changed (step F1).

The controller 40 reads from the part image ROM 41B the respective part images indicated by the numbers set initially in the part RAM 23 on the basis of those numbers, and transfers, disposes and synthesizes those part images to and in the synthesis RAM 43 (step F2). The details of the synthesis process performed at step F2 will be described in more detail later.

The controller 40 displays on the display 3 a portrait image created in the synthesis RAM 43 (step F3).

The controller 40 determines whether the basic portrait selection keys 20A, 20B of the input unit 2 have been operated (step F4). If the basic portrait selection key 20A has been operated, at step F5 the (part image) numbers indicative of all the basic part images to be synthesized are incremented by one (In this case, since the part image numbers have been initially set at "01", they are incremented to "02" whereas if they are already "20", they are changed to "01".). The control then returns to step F2.

If the basic portrait selection key 20B has been operated, at step F5 the (part image) numbers indicative of all the basic part images to be synthesized are decremented by one (In this case, since the part image numbers have been initially set at "01", they are changed to "20".). The control then returns to step F2.

If not at step F4, the controller 40 determines whether the part designation keys 21a, 21b of the input unit 2 have been operated (step F6). If the part designation key 21a has been operated, at step F7 a number indicative of a part image to be changed is incremented by one (in this case, the number is updated from the initially set number "01" (contour) to a number "02" (hair style) whereas if the part image number is already "12" (beard), it is changed to "01" (contour). Thus, the control returns to step F2.

When the part designation key 21b has been operated, at step F7 the part image number to be changed is decremented by one (In this case, since the initially set part image number is "01" (contour), the part image number is changed to "12" (beard)). The control then returns to step F2.

If not at step F6, the controller 40 determines whether the part image selection keys 22a, 22b of the input unit 2 have been operated (step F8).

If the part image selection key 22b has been operated, at step F9 a number indicative of a part image to be changed is updated (incremented by one). If the part image to be changed is a basic part image and its number is an end one, the number is changed to "01". If the part image to be changed is a subsidiary part image and its number is an end one, the number is handled as "None" and hence changed to "01".

If the part image selection key 22a has been selected, at step F9 the number indicative of the part image to be changed is updated (decremented by one). If the part image to be changed is a basic part image and its number is "01", the number is handled as the end one. If the part image to be changed is a subsidiary part image and its number is 01, the number is handled as "None" and hence as the end one.

If not at step F8, the controller 40 determines whether the record key 18 of the input unit 2 has been operated (step F10). If so, the controller 40 records in the portrait image storage RAM 29 data on the numbers indicative of the respective part images which constitute the portrait image stored in the synthesis RAM 43 (step F11) to thereby end the portrait image creation process. In the recording process, a record number indicative of the portrait image may be keyed in.

If the controller 40 determines at step F10 that the record key 18 has not been operated, the control returns to step F4.

Thus, by the initialization at step F1, a first or basic portrait image is created and displayed which is composed of all the basic part images numbered "01".

When the user operates the basic portrait image selection key 20A or 20B sequentially, first-twentieth basic portrait images each composed of all basic part images indicated by the same number are correspondingly created and displayed. Thus, the user can select any one closest to her desired portrait image from among the twenty basic portrait images.

If any particular part image (for example, for a contour) of the displayed basic portrait image is to be changed to another one, the user operates the part designation keys 21a, 21b to designate a part to be changed and then operates the part image selection keys 22a, 22b to change the image of the part to another desired one.

If a subsidiary part image is added to a basic portrait image, or if an already added subsidiary part image is changed or removed, the user operates the part designation keys 21a and 21b to designate a part to be added or changed and then operates the part image selection keys 22a, 22b to designate any part image.

By such operations, any part image is changed to another one or any subsidiary part image is added to, or removed from, a half-finished portrait image to thereby create a portrait image closest to the target or desired one.

Figure 30:
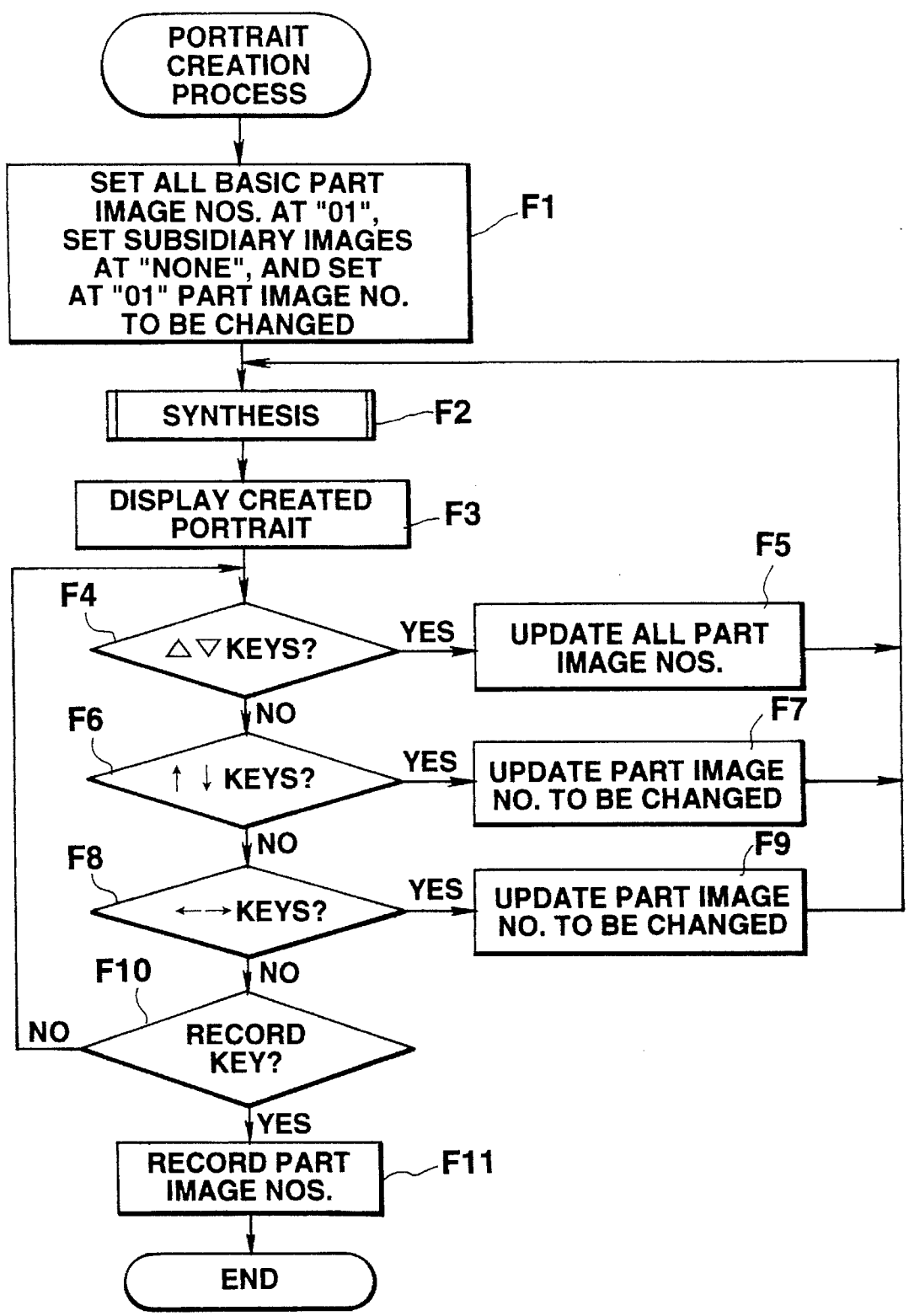
FIG. 30 is a flowchart indicative of a portrait image creation process.
Figure 31:
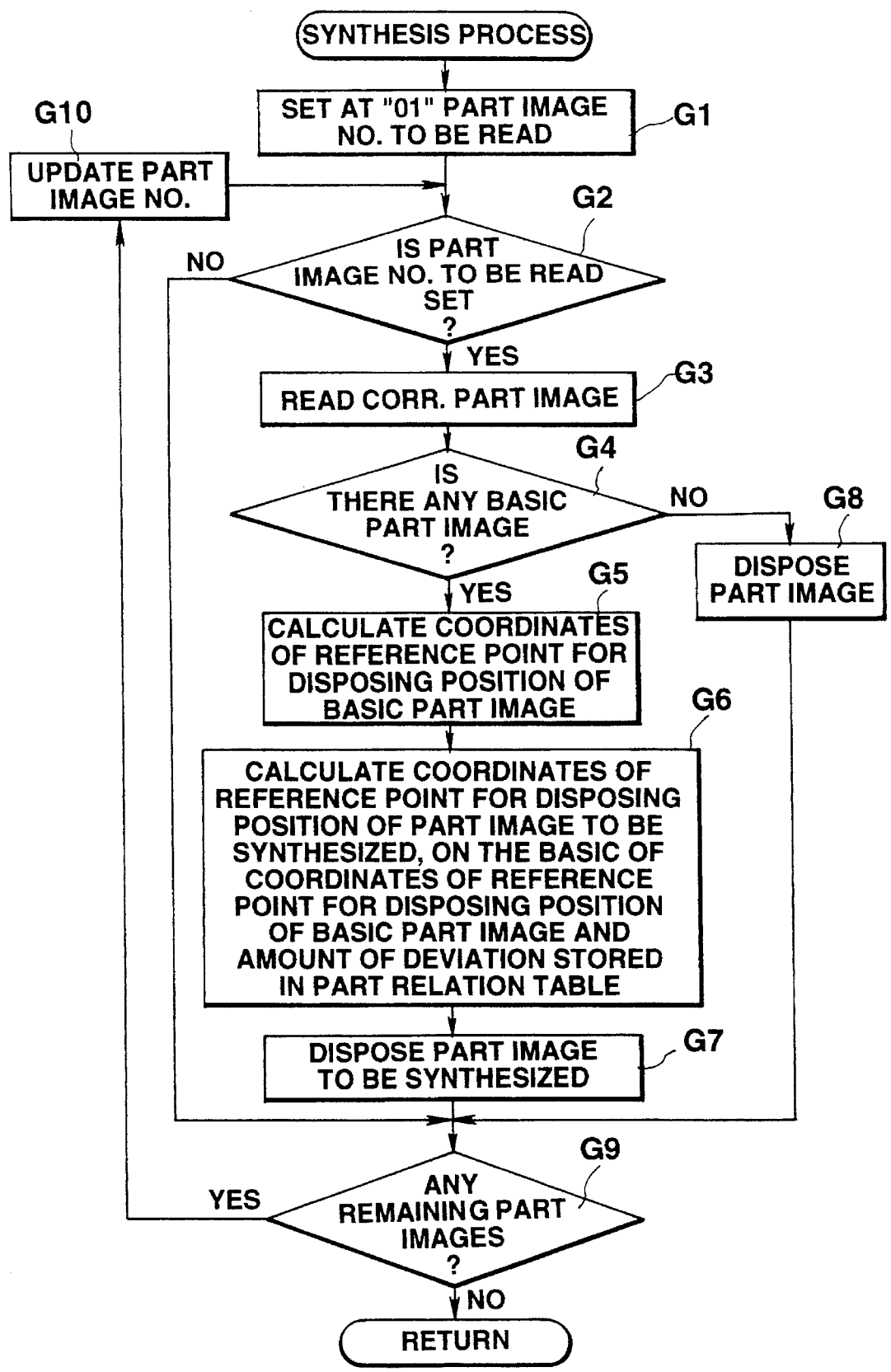
FIG. 31 is a flowchart indicative of the details of a synthesis process of FIG. 30.

The synthesis process performed at step F2 of FIG. 30 will be described with respect to a flowchart of FIG. 31.

First, the controller 40 sets a number indicative of a part image to be read at "01" (contour) (step G1).

The controller 40 determines whether the number indicative of the part image to be read has been set, by referring to the part RAM 23 (step G2). If there is a part for which no part image number is set (for example, forehead wrinkles of FIG. 27), the control jumps to step G9 to be described in more detail later.

If so at step G2, the controller 40 reads a part image indicated by the appropriate part image number from the part image ROM 41B (step G3).

The controller 40 accesses the part relation table 27 to determine whether there is a basic part image to be read (step G4).

If so (if the read part image is a subsidiary part image), the controller 40 calculates the coordinates of a reference point for the disposing or synthesis position of the basic part image on the synthesis plane of FIG. 5 (step G5).

The controller 40 calculates the coordinates of a reference point for the disposing position of a part image to be synthesized, on the basis of the coordinates of the reference point for the synthesis position of the basic part image and an amount of deviation, data on which is stored in the part relation table 27 (step G6).

The controller 40 disposes the part image read at step G3 at a synthesis position corresponding to the calculated reference point on the basis of same (sep G7).

When the controller 40 determines at step G4 that there is no basic part image (if the read part image is a part image subsidiary to the basic part image), the controller 40 disposes the part image read at step G3 at the corresponding preset synthesis position on the synthesis plane (step G8).

After processing at step G7 or G8, the controller determines whether there are any parts not disposed so far (step G9). If so, at step G10 the controller 40 updates or increments the part image number. The control then passes to step G2. When all the part images have been disposed, the control passes to step F5 of FIG. 30.

When the print key 13h is operated, the controller 40 reads a figure (a dot matrix image) disposed and synthesized in the synthesis RAM 43, and controls the printer 51 through the print controller 50 to print the figure.

By the operation of the read key 14, the controller 40 transfers to the part RAM 23 data on the numbers indicative of the respective part images of any portrait image stored in the portrait image storage RAM 29. In addition, the controller 40 disposes the part images in the synthesis RAM 43 and synthesizes a portrait image in the synthesis process of FIG. 31. The controller 40 displays the created portrait image on the display 3 through the display driver 45.

According to the sixth embodiment, when a portrait image is created by any combination of a plurality of prepared part images, the synthesis positions of the respective part images are adjusted so as to form an optimal positional relationship. Thus, no deviation of the synthesis positions of the part images occurs and hence the related part images are synthesized without giving a sense of incompatibility.

The created portrait image can be stored and output (displayed/printed) as required.

While in the present embodiment the subsidiary part image is adjusted in position to the basic part image when the subsidiary part image is combined with the basic part image, the adjustment of the position and sizes of the part images may be made at the same time.

Alternatively, when the part image is disposed at step G1, a subsidiary part image may be scaled up or down in accordance with scale-up/down magnifications, data on which is preset along with data on amounts of deviation in the part relation table 27.

Figure 32:
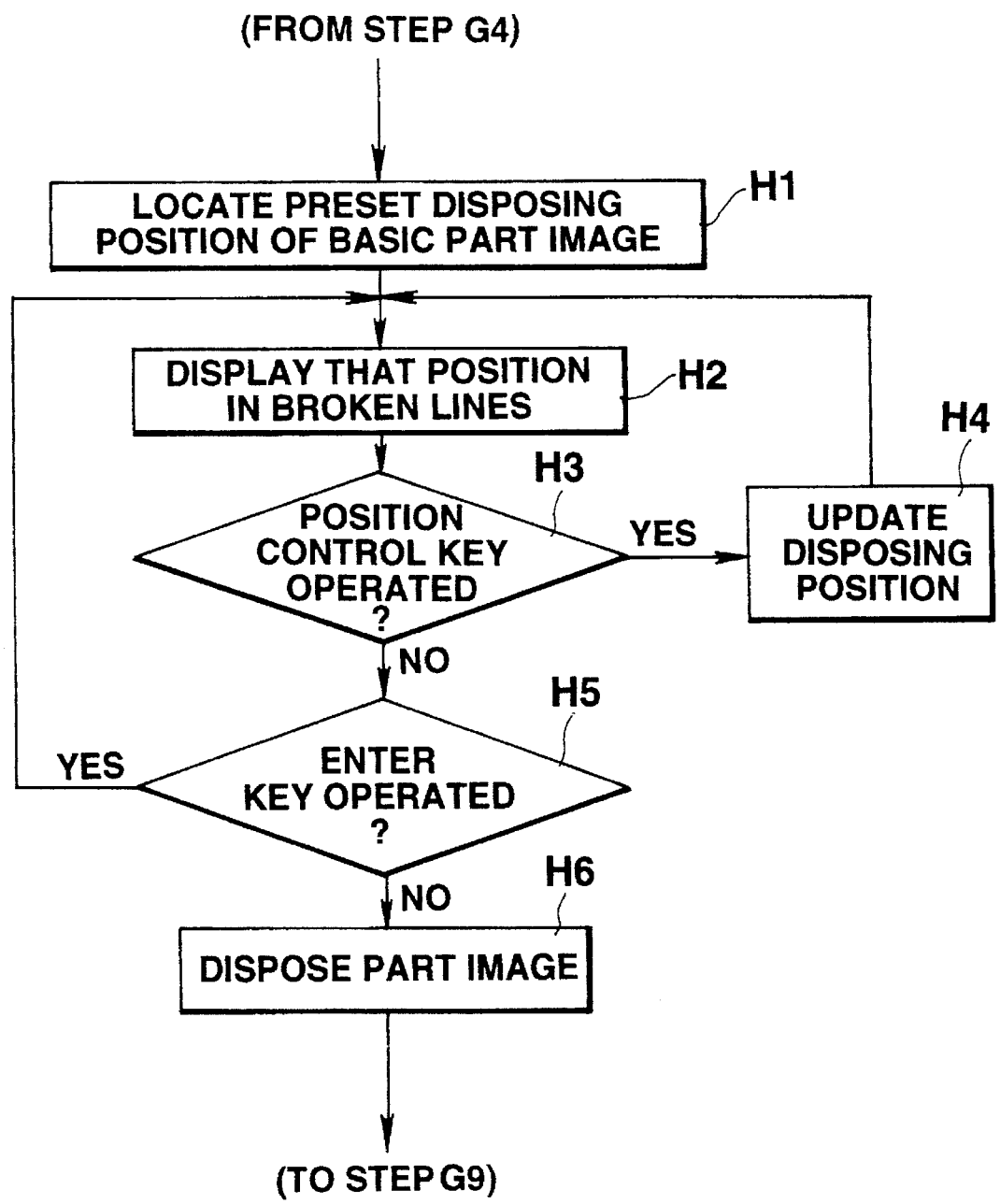
FIG. 32 is a flowchart indicative of a modification of the synthesis process of FIG. 31.

While in the particular embodiment the basic part images were disposed at the respective preset positions, the disposing positions of the basic part images may be adjusted by the operation of a key of the input unit 2. In this case, for example, as shown in FIG. 32, the controller 40 locates the preset disposing position of a basic part image on the synthesis plane (step H1), and displays it in broken lines (step H2). When the user operates a position control key (for example, a cursor key) of the input unit 2, the controller 40 adjusts the position of the basic part image in accordance with the operation of the position control key (steps H3, H4) and displays the adjusted disposing position (step H2).

When the user then has operated the enter key, the controller 40 disposes that part image at the set position (steps H5, H6).

According to such arrangement, even when the disposing position of the basic part image is adjusted (or changed), the position of the basic part image is a reference position for which its subsidiary part image is disposed. Thus, no deviation of disposing positions occur between the basic and subsidiary part images, and a portrait image which gives no sense of incompatibility is created. The disposing positions of not only the basic part image but also its subsidiary part image may be adjusted.

While in the example of FIG. 28 an amount of deviation in position between part images to be combined is stored for such combination in the part relation table 27, an amount of deviation in synthesis position between a subsidiary part image and the corresponding basic part image may be stored for each part in the part relation table 27, for example, as shown in FIG. 33. In this case, for example, the glasses images each are preferably made such that the glasses image coincides in center with eyes images. In this case, for example, when the disposing position of the basic part image is adjusted (or changed), that of a subsidiary part image is also adjusted automatically. Thus, no deviation in disposition between the basic and subsidiary part images occur.

While in the particular embodiment the basic part images for the contour, hair style, eyes, nose, mouth and eyebrows, and the subsidiary part images for glasses, under-eyes wrinkles, forehead wrinkles, nose wrinkles, mustache and beard have been shown and described, those are only illustrative, and other part images may be used as basic or subsidiary part images.

While in the embodiments the present invention has been described concerning the creation of a portrait as an example, the present invention is applicable to any image creation devices which create any target by combination of any part images. For example, a car image may be created by combination of ones selected from part images of a car image beforehand stored.

The present invention is not restricted to dedicated image creation devices, but also applicable widely to electronic notebooks, word processors, and personal computers, which are capable of storing portrait image data along with individual data, and label printers which create a complete image such as a portrait image and print same on a label, etc.

As described above, according to the embodiments, when beforehand recorded part images are appropriately combined into an image, the positional relationship between the part images is adjusted automatically such that it is a best one, and hence an image which gives no sense of incompatibility is created.

What is claimed is:

1. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the specified position being different from the corresponding predetermined position associated with the at least one selected part image, the synthesis means disposing each of said selected part images, except the at least one selected part image, at the corresponding predetermined position associated with each of the selected part images to thereby form the desired image; and e) output means for outputting the desired image formed by said synthesis means.

2. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the specified position being different from the corresponding predetermined position associated with the at least one selected part image, the synthesis means disposing each of said selected part images, except the at least one selected part image, at the corresponding predetermined position associated with each of the selected part images to thereby form the desired image;

e) subsidiary part image storage means for storing subsidiary part images to be added to corresponding part images stored in said part image storage means; and f) subsidiary image addition means for reading from said subsidiary part image storage means a subsidiary part image to be added to the corresponding part image included in the desired image, the subsidiary image addition means adding the read subsidiary part image to the corresponding part image to modify the desired image formed by said synthesis means; and g) output means for outputting the desired image modified by said subsidiary image addition means.

3. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the specified position being different from the predetermined position associated with the at least one selected part image, the synthesis means disposing each of said selected part images, except the at least one selected part image, at the corresponding predetermined position associated with each of the selected part images to thereby form the desired image; and e) output means for outputting the desired image composed by said composing means, wherein said synthesis means comprises:
1) image synthesis and storage means;
2) synthesis position storage means for storing synthesis positions of said image synthesis and storage means where respective part images are to be disposed in accordance with the attributes set by said attribute setting means; and
3) disposition means for disposing part images selected by said selection means at corresponding synthesis positions of said image synthesis and storage means in accordance with the attribute set by said attribute setting means.

4. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the specified position being different from the corresponding predetermined position associated with the at least one selected part image, the synthesis means disposing each of said selected part images, except the at least one selected part image, at the corresponding predetermined position with each of the selected part images to thereby form the desired image; and wherein said synthesis means comprises:
1) image synthesis storage means;
2) reference synthesis position storage means for storing reference synthesis positions of said image synthesis and storage means where the part images are to be disposed;
3) changed position storage means for storing positions of the part images that are changed from the reference synthesis positions in accordance with each of the attributes; and
4) change means for moving at least one of the part images disposed by said synthesis means at the reference synthesis positions to changed positions stored in said changed position storage means in accordance with the attribute set by said attribute setting means to form a modified image;

said image creation device further comprising:

e) output means for outputting the image modified by said change means.

5. An image creation device according to claim 4, wherein the attribute set by said attribute setting means comprises at least one of a sex, an age, an impression and a characteristic of the composed image, and changed positions of the respective part images stored in said changed position storage means being substantially different from the reference synthesis positions, the changed positions representing positions where the respective part images are to be disposed in accordance with the attribute set by said attribute setting means.

6. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired to be formed;

d) synthesis means for placing at least one of the part images selected by said selection means at a specified position in accordance with the attribute set by said attribute setting means, the specified position being different from the corresponding predetermined position associated with the at least one selected part image, the synthesis means disposing each of said selected part images, except the at least one selected part images, at the corresponding predetermined position associated with each of the selected part images to thereby form the desired image;

wherein said composing means comprises:
1) image synthesis storage means;
2) positional relationship storage means for storing positional relationships of respective part images disposed in said image synthesis storage means for each attribute set by said attribute setting means; and
3) disposition means for disposing part images selected by said selection means based on the corresponding positional relationship with respect to the attribute to form the desired image;

said image creation device further comprising:

e) output means for outputting the desired image formed by said disposition and synthesis means.

7. An image creation device for forming a desired image comprising:

a) part image storage means for storing a plurality of part images for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the specified position being different from the predetermined position associated with the at least one selected part image, the synthesis means disposing each of said selected part images, except the at least one selected part image, at the corresponding predetermined position associated with each of the selected part images to thereby form the desired image;

e) subsidiary part image storage means for storing subsidiary part images to be added to corresponding part images stored in said part image storage means; and f) subsidiary image addition means for reading from said subsidiary part image storage means a subsidiary part image to be added to the corresponding part image included in the desired image, the subsidiary image addition means adding the read subsidiary part image to the corresponding part image to modify the desired image composed by said composing means; and g) output means for outputting the desired image modified by said subsidiary image addition means;

and wherein the desired image to be formed by said synthesis means is a face image, and each of the plurality of part images is a portion of the face image, and the subsidiary part images stored in said subsidiary part image storage means each comprise a wrinkle image to be added to the part images of the face image.

8. An image creation device for forming a target image comprising:

a) part image storage means for storing a plurality of first part images and a plurality of second part images to be annexed to the corresponding first part images;

b) positional relationship storage means for storing a positional relationship between a first position where a corresponding first part image is to be disposed and a second position where a corresponding second part image is to be disposed;

c) selection means for selecting first and second part images from among the plurality of first and second part images stored in said part image storage means;

d) synthesis means for disposing the selected first and second part images in accordance with the positional relationship stored in said positional relationship storage means to form the target image; and e) output means for outputting the target image formed by said synthesis means.

9. An image creation device according to claim 8, wherein said positional relationship storage means stores deviations between the first positions of each of the plurality of first part images and the second positions of each of the plurality of second part images.

10. An image creation device according to claim 8, further comprising:

position adjustment means for adjusting at least one of the first position of the first part image and the second position of the second part image.

11. An image creation device according to claim 8, wherein the target image is a face image, and the first part images correspond to main parts of the face image, and the second part images correspond to subsidiary parts of the face image to be added to a respective first part image.

12. An image creation device according to claim 8, wherein the plurality of part images contained in said part image storage means includes a plurality of part images for each of the parts which form the target image, and said selection means selects a part image for each of the parts from among the plurality of part images contained in said part image storage means.

13. An image creation device for forming a target image comprising:

a) part image storage means for storing a plurality part images;

b) positional relationship storage means for storing deviations in the placement of each of the plurality of part images;

c) selection means for selecting at least two of the plurality of part images to form the target image;

d) disposition and synthesis means for disposing the at least two selected part images in accordance with the deviations stored in said positional deviation storage means to form the target image; and e) output means for outputting the target image formed by said disposition and synthesis means.

14. An image creation device according to claim 13, wherein a first of the at least two part images comprises a main part image which represents a main part of a face image, and a second of the at least two part images comprises a subsidiary part image to be added to the main part image.

15. An image creation device for forming a desired image of an object comprising:

a) part image storage means for storing a plurality of part images for a plurality of portions of an object for placement at corresponding predetermined positions;

b) selection means for selecting part images from among the plurality of part images stored in said part image storage means;

c) attribute setting means for setting an attribute of the desired image to be formed;

d) synthesis means for placing at least one of the part images selected by said selection means at a specified position in accordance with the attribute set by said attribute setting means, the synthesis means placing each of said selected part images, except the at least one part image placed at the specified position, at corresponding predetermined positions associated with each of said selected part images, thereby forming the desired image of the object; and e) output means for outputting the desired image of the object formed by said synthesis means.

\* \* \* \* \*